(12) United States Patent
Zimmerman

(10) Patent No.: US 10,586,374 B2
(45) Date of Patent: Mar. 10, 2020

(54) BOUNDING VOLUME HIERARCHY USING VIRTUAL GRID

(71) Applicant: Alvin D. Zimmerman, Pleasanton, CA (US)

(72) Inventor: Alvin D. Zimmerman, Pleasanton, CA (US)

( * ) Notice: Subject to any disclaimer, the term of this patent is extended or adjusted under 35 U.S.C. 154(b) by 0 days.

(21) Appl. No.: 15/986,600

(22) Filed: May 22, 2018

(65) Prior Publication Data

US 2019/0035139 A1 Jan. 31, 2019

Related U.S. Application Data

(60) Provisional application No. 62/537,341, filed on Jul. 26, 2017.

(51) Int. Cl.
*G06T 15/00* (2011.01)
*G06T 15/06* (2011.01)
*G06T 15/50* (2011.01)
*G06T 17/00* (2006.01)

(52) U.S. Cl.
CPC ............. *G06T 15/06* (2013.01); *G06T 15/50* (2013.01); *G06T 17/005* (2013.01)

(58) Field of Classification Search
CPC ........ G06T 15/06; G06T 17/005; G06T 15/50
USPC ....................................................... 345/419
See application file for complete search history.

(56) References Cited

U.S. PATENT DOCUMENTS 9,569,559 B2 * 2/2017 Karras ................ G06F 16/9027
9,691,177 B2 * 6/2017 Silvennoinen .......... G06T 15/40
9,984,492 B2 * 5/2018 Obert ........................ G06T 1/20

OTHER PUBLICATIONS

Larsson T, Akenine-Möller T. Strategies for bounding volume hierarchy updates for ray tracing of deformable models. MRTC Report. Feb. 21, 2003.*
Lauterbach et al.: "Fast BVH Construction on GPUs"; Eurographics 2009; vol. 28 (2009), No. 2; 10 pages.
Aila et al.: "Architecture Considerations for Tracing Incoherent Rays"; High Performance Graphics (2010); The Eurographics Association 2010; 10 pages.
Ganestam et al.: "Bonsai: Rapid Bounding Volume Hierarchy Generation Using Mini Trees"; Journal of Computer Graphics Techniques; vol. 4, No. 3, 2015; 20 pages.
Dammertz et al: "Shallow Bounding Volume Hierarchies for Fast SIMD Ray Tracing of Incoherent Rays"; Reprint of paper submitted to EGSR 08 Proceedings of the Nineteenth Eurographics conference on Rendering; 2008 Article; 10 pages.
Wald: "On fast Construction of SAH-based Bounding Volume Hierarchies"; RT '07 Proceedings of the 2007 IEEE Symposium on Interactive Ray Tracing; 2007 Article; 10 pages.
Garanzha et al.: "Grid-based SAH BVH constructions on a GPU"; Vis Comput DOI 10.1007/s00371-011-0593-8; published online: May 5, 2011; 10 pages.
MacDonald et al.: "Heuristics for Ray Tracing Using Space Sub-division"; Graphics Interface '89; 12 pages.

(Continued)

*Primary Examiner* — Phu K Nguyen
(74) *Attorney, Agent, or Firm* — Fountainhead Law Group P.C.

(57) ABSTRACT

A method and system for ray tracing can include defining a bounding volume hierarchy (BVH) of a scene comprising several objects. Objects can be binned to the BVHs using bitmaps that represent the objects and bitmaps that represent the bounding volumes.

20 Claims, 24 Drawing Sheets

(56) References Cited

OTHER PUBLICATIONS

Jevans et al.: "Adaptive Voxel Subdivision for Ray Tracing"; Graphics Interface '89; 9 pages.
Wald et al.: "Ray Tracing Animated Scenes using Coherent Grid Traversal"; ACM 2006; 9 pages.
Pantaleoni et al.: "HLBVH: Hierarchical LBVH Construction for Real-Time Ray Tracing of Dynamic Geometry"; High Performance Graphics (2010); the Eurographics Association 2010; 9 pages.
Perard-Gayot et al: "GPU Ray Tracing using Irregular Grids"; Eurographics 2017; 10 pages.
Ize et al.: "Grid Creation Strategies for Efficient Ray Tracing"; RT '07 Proceedings of the 2007 IEEE Symposium on Interactive Ray Tracing; 2007 Article; 8 pages.
Wald: "Fast Construction of SAH BVHs on the Intel Many Integrated Core (MIC) Architecture"; IEEE Transactions on Visualization and Computer Graphics, vol. 18, Issue 1, Jan. 2012; 2012 Article; 10 pages.
Ize et al.: "An Evaluation of Parallel Grid Construction for Ray Tracing Dynamic Scenes"; 2006 IEEE Symposium on Interactive Ray Tracing; 10 pages.
Boulos et al.: "Adaptive Ray Packet Reordering"; 2008 IEEE Symposium on Interactive Ray Tracing; 10 pages.
Stich et al.: "Spatial Splits in Bounding Volume Hierarchies"; HPG '09 Proceedings of the Conference on High Performance Graphics 2009; 2009 Article; 9 pages.
Kalojanov et al.: "Two-Level Grids for Ray Tracing on GPUs"; Eurographics 2010; vol. 30 (2011), No. 2; 8 pages.
Vaidyanathan et al: "Watertight Ray Traversal with Reduced Precision"; High Performance Graphics (2016); Eurographics Proceedings 2016; 8 pages.

\* cited by examiner

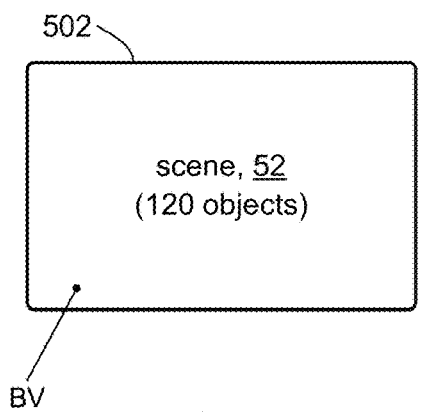
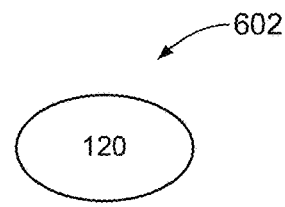
FIG. 5A
FIG. 6A
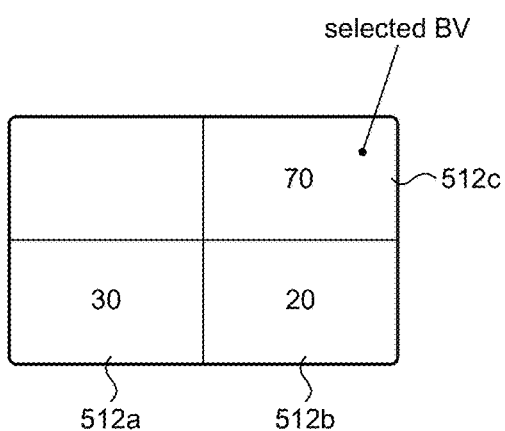
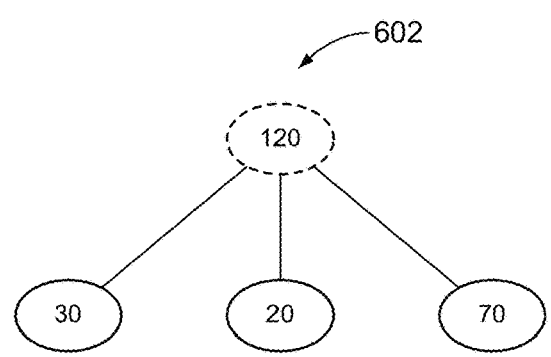
FIG. 5B
FIG. 6B
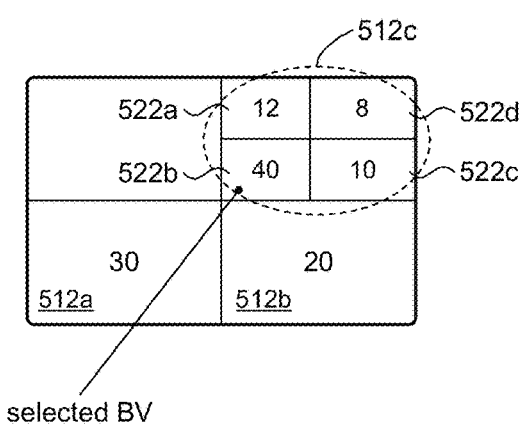
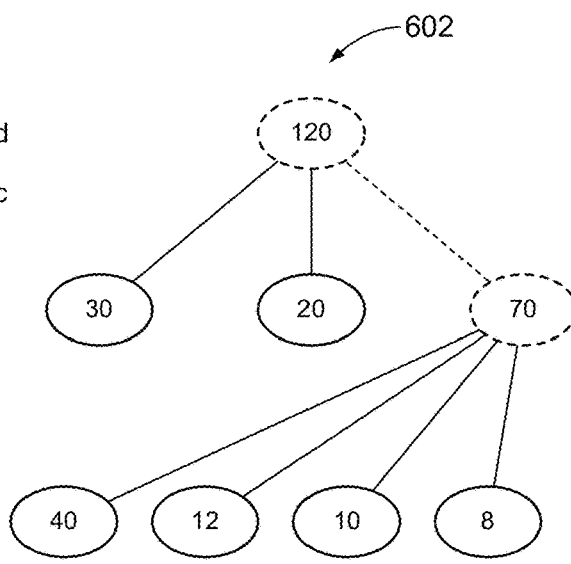
FIG. 5C
FIG. 6C

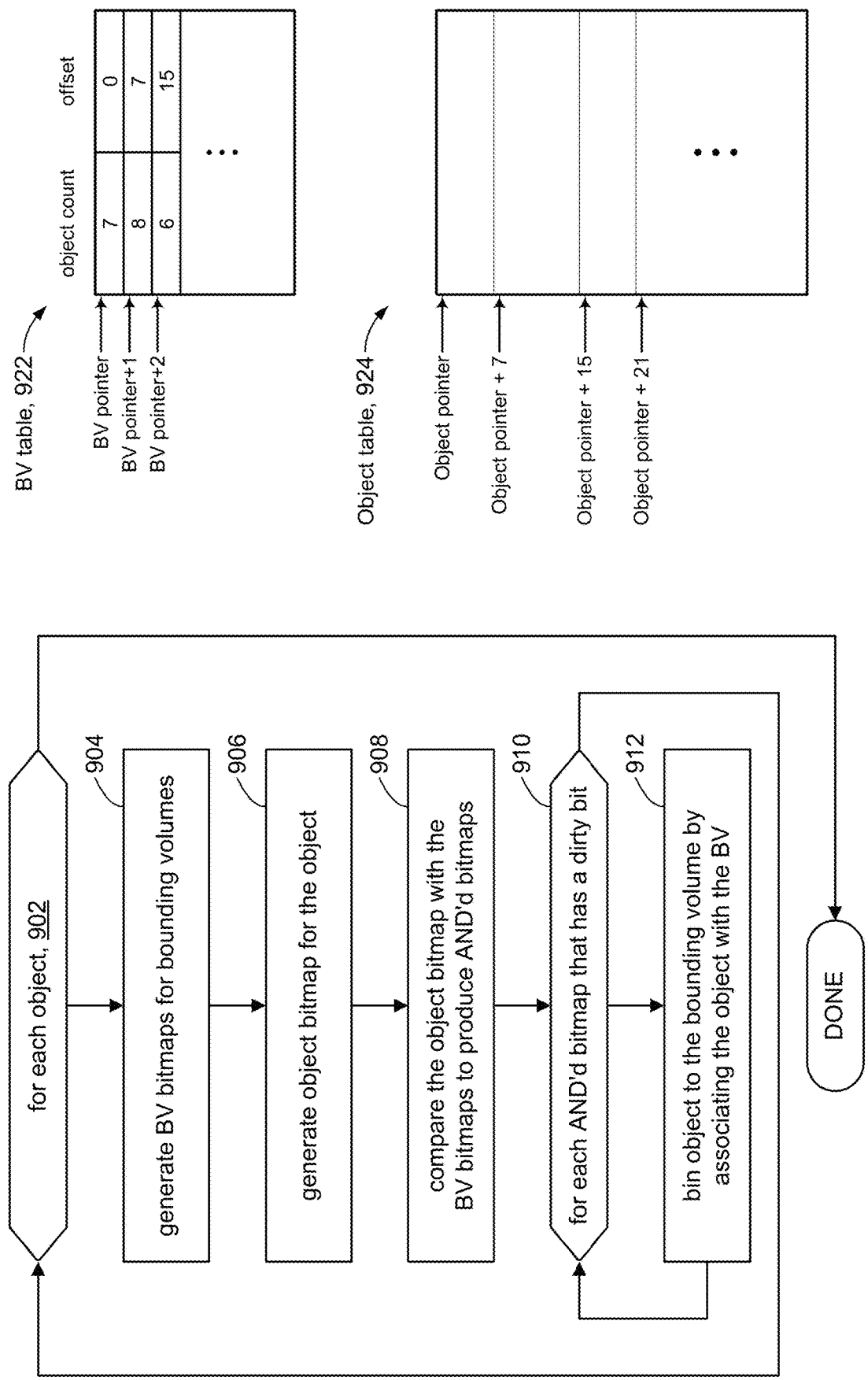

BOUNDING VOLUME HIERARCHY USING VIRTUAL GRID

CROSS REFERENCE TO RELATED APPLICATIONS

Pursuant to 35 U.S.C. § 119(e), this application is entitled to and claims the benefit of the filing date of U.S. Provisional App. No. 62/537,341 filed Jul. 26, 2017, the content of which is incorporated herein by reference in its entirety for all purposes.

This application incorporates herein by reference, in its entirety for all purposes, commonly owned U.S. Pat. No. 9,035,946, entitled "Computer Hardware Architecture and Data Structures for Triangle Binning to Support Incoherent Ray Traversal."

BACKGROUND

Computerized rendering of a scene involves simulating the interaction of light with objects in the scene. Ray tracing is a well studied technique that involves tracing the path of light as it bounces around the scene. A challenge with ray tracing is determining which parts of a scene are hit by a given ray of light. In order to render a scene with sufficient quality, the process can require tracing millions of rays through the scene. Objects in a scene are generally represented by triangles, although any suitable geometric shape can be used. Tracing a ray through a scene involves testing the ray for intersection with each triangle.

Scenes can easily contain many thousands of triangles, leading to many billions of ray/triangle intersection tests, which can quickly become impractical. It is generally accepted that calculating intersections between rays and triangles is the most computationally expensive aspect of the ray tracing method. Acceleration structures have been developed to reduce the number of ray/triangle intersections tests, and thus accelerate the image rendering process. The idea behind acceleration structures is to help decide as quickly as possible which triangles in a scene that a particular ray is likely to intersect and to reject the large majority of the triangles which the ray will never hit.

One type of acceleration structure is called the bounding volume hierarchy (BVH). The BVH is a hierarchical structure that partitions the objects in a scene. For example, where the objects are represented by triangles, a bounding volume may enclose all or portions of some triangles in the scene. Bounding volumes can be any suitable shape (e.g., sphere, cylinder, etc.), but are typically cubes (six square faces) or cuboids (six rectangular faces) and thus are commonly referred to as bounding boxes. The motivation behind bounding volumes is that performing an intersection test with a bounding volume is usually cheaper than performing the test with each triangle (or other geometry) enclosed by the bounding volume.

A BVH defines a tree comprising a root node corresponding to a bounding volume that contains all other bounding volumes, and hence all the triangles that comprise the scene. In other words, the bounding volume at the root node represents the entire scene. Each node in the tree has a number of children that are either internal nodes that contain further bounding volumes (e.g., a sub tree of bounding volumes) or are leaf nodes.

Building efficient acceleration structures for random spatial data (e.g., triangles) is an ever evolving and much published topic. Top-down and bottom-up builders have been researched with each having advantages and disadvantages. Top-down organizations work well with data sets that are too large to fit on-chip, while a bottom-up organization works well with data sets that can fit on-chip. As data sets continually grow in size, new hardware algorithms are required for organizing data structures that are too large to be stored on-chip. This and other issues are addressed by embodiments of the present disclosure, individually and collectively.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 5A-5F and respective FIGS. 6A-6F show an illustrative example of the flow described in FIG. 4, showing the defining of a bounding volume hierarchy (FIGS. 5A-5F) and the a bounding volume (BV) tree (FIGS. 6A-6F).

FIG. 9A shows a high level flow for binning objects to bounding volumes in accordance with the present disclosure.

FIG. 9B shows an example of some data structures for binning objects to bounding volumes in accordance with an illustrative embodiment.

DETAILED DESCRIPTION

The present disclosure describes, in accordance with some embodiments, a lossless multi-level hierarchical, top-down builder for organizing spatial data sets and creating an acceleration structure in a fixed memory size. With L equal to the number of levels in the hierarchy and N the number of objects, processing in accordance with the present disclosure can organize spatial data sets in linear O(2LN) time as a lower bound, depending on the number of levels in the hierarchy. The present disclosure describes an acceleration structure and methods using the acceleration structure that can minimize data movement by limiting the number of hierarchical levels and targets in a balanced tree based on spatial density.

The present disclosure defines an acceleration structure from scratch, developing a hardware algorithm to organize random spatial data sets around the random data access time to external memory. Advancing silicon density allows for on-chip compute and memory resources for the new operations and data flows. Top-down building can be performed as the data sets become too large to store on-chip.

By making a hierarchical acceleration structure shallow, the acceleration structure becomes wide. Even with wide trees, object distribution is considered entirely random with different sized objects and spatial density. To organize with limited depth and width, the resulting tree is built with an algorithmic target of balance.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1A:
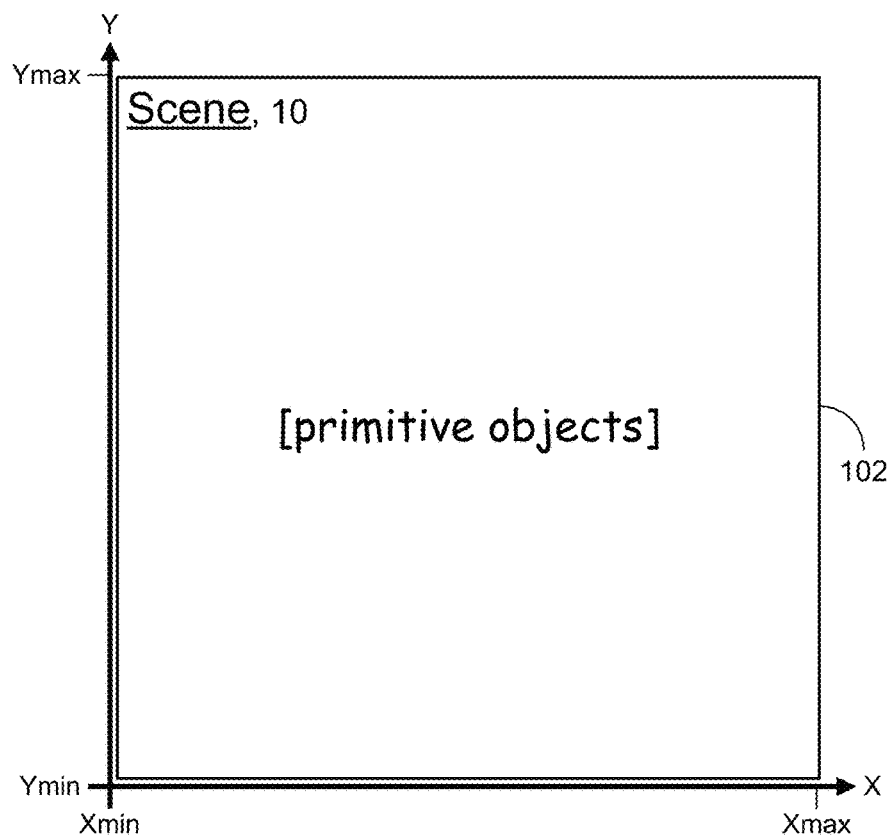
FIGS. 1A, 1B, and 1C illustrate scene and cell partitioning.

FIG. 1A represents a scene 10 to be rendered. The scene 10 shown in the figure is a two-dimensional (2D) scene in order to simplify the figures and discussion. Persons of ordinary skill in the art will understand, however, that the discussion can be readily adapted for 3D scenes.

The scene 10 can be associated with "world coordinates." Typical world coordinate systems include a Cartesian coordinate system (shown in the figure), a polar coordinate system, or any other suitable coordinate system. In some embodiments, a Cartesian coordinate system is used and the world coordinates can be expressed as Xmin, Xmax, Ymin, and Ymax values in an X-Y Cartesian coordinate system. Data representing the primitive objects that comprise scene 10 can represent their locations in the scene in terms of the scene's world coordinates. World coordinates can be expressed as real (floating point) numbers or integers.

The scene 10 can be spatially decomposed (partitioned) into grids of cells. A quad tree decomposition, for example, can be used to divide the scene 10 into grids of cells to create hierarchies of axis-aligned cells, starting with the entire scene itself as the initial "cell" at the first level in the hierarchy. At each subsequent level in the hierarchy, a cell can be partitioned (subdivided) into a grid of cells.

Figure 1B:
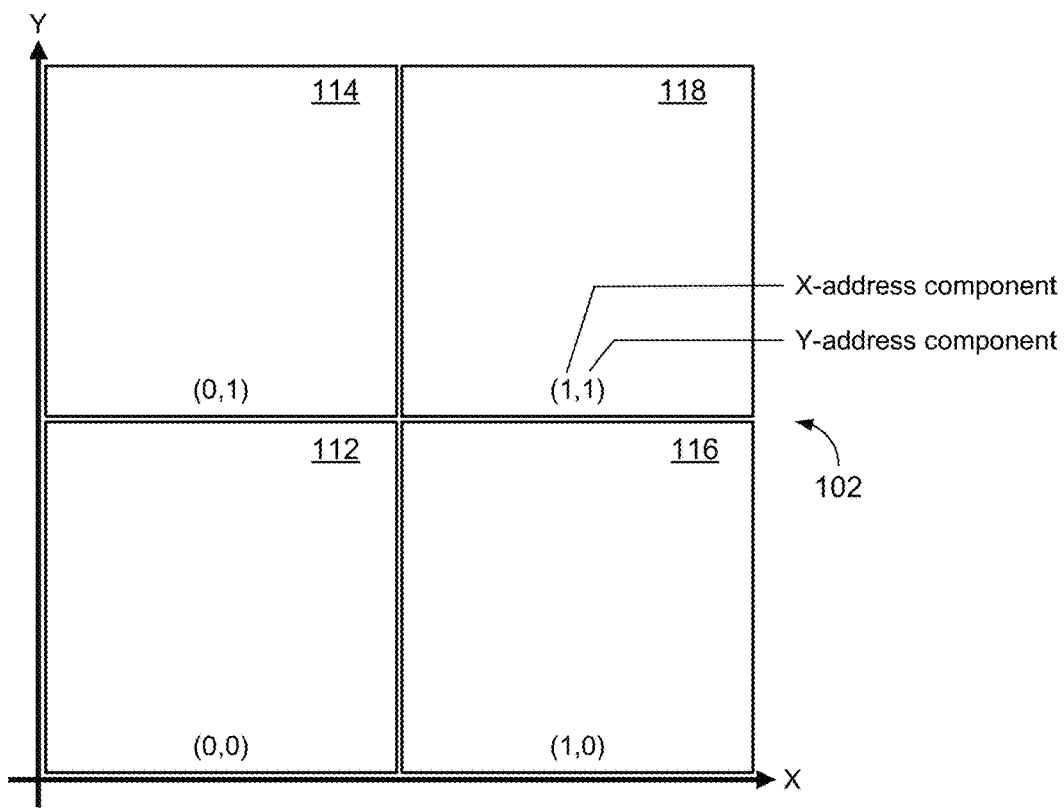

Merely for the purposes of explanation, we can assume a partitioning of 2×2 cells at each level. Referring to FIG. 1B, for example, the entire scene 10, at the highest level in the hierarchy, can be partitioned into a grid 102 of four cells 112, 114, 116, 118. Each cell 112-118 can be associated with a "cell address" that represents the position of that cell within the grid. Each cell has a position along an X-axis and along a Y-axis. In some embodiments, the cell address comprises an X-address component and a Y-address component. The cell address can be a two-bit value for a 2×2 grid of four cells, one bit for an X-address component and one bit for a Y-address component. The cells can be addressed as illustrated in FIG. 1B; for example, the address of cell 112 is (0, 0), the address of cell 114 is (0, 1) the address of cell 116 is (1, 0), and the address of cell 118 is (1, 1). It will be appreciated, of course, that any other addressing convention can be employed.

Figure 1C:
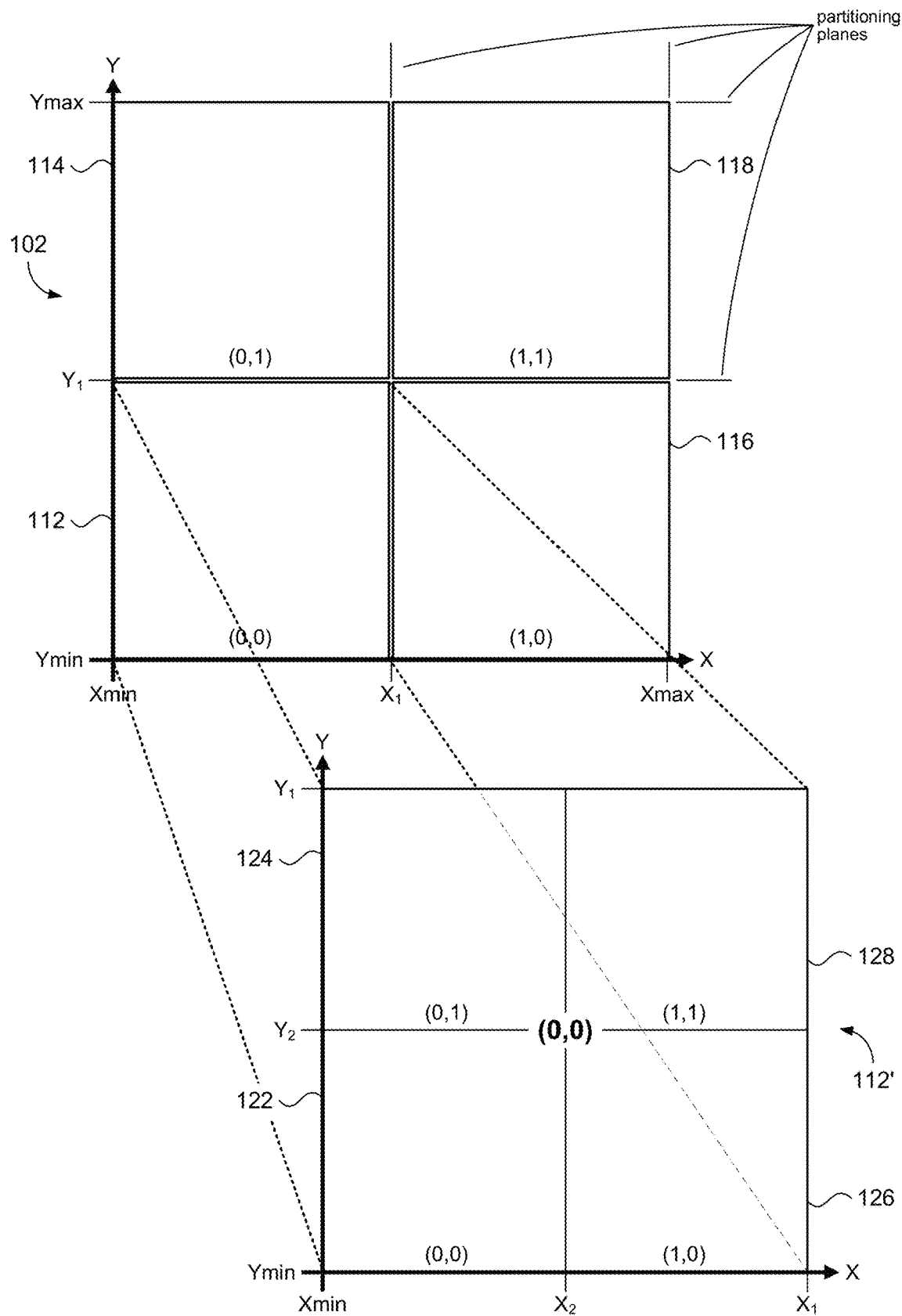

The scene 10 can be partitioned into a hierarchy of such grids. The cells of a grid at a given level k in the hierarchy ("level k cells") can be partitioned into a grid of cells at the next lower level k+1 in the hierarchy. Referring to FIG. 1C, for example, the grid 102 (first level of the hierarchy) comprises four cells 112-118. Each cell 112-118 can be partitioned into its own grid of cells at the next level in the hierarchy. Thus, for example, cell 112 can be partitioned into a grid 112' that comprises cells 122, 124, 126, 128. Likewise, though not shown in FIG. 1C, cells 114, 116, 118 can be partitioned into their respective grids of cells. The grid resolution at each level in the hierarchy can be the same, or can vary from one level to another. The examples shown in FIGS. 1B and 1C, for instance, use a 2×2 grid resolution at each level.

Cell addressing at each partitioning level can follow the same convention. The cells 122-128, in turn, can be further partitioned into grids of cells (not shown in the figure) at a third level in the hierarchy, and so on. This progression can continue with additional partitioning levels until a termination criterion is met; e.g., the system may define a total of N partitioning levels.

FIG. 1C further illustrates that each grid can be represented in terms of the world coordinates of the original scene 10. Thus, for example, the world coordinates for grid 112' can be expressed as Xmin, $X_1$, Ymin, $Y_1$, which represent the coordinates of cell 112 in terms of the world coordinates. The world coordinates for the cell at address (1, 1) in grid 112' are $X_2$, $X_1$, $Y_2$, $Y_1$, and so on. The world coordinates can identify partitioning planes that partition the scene into cells 112. Partitioning planes are known to persons of skill in the art. For example, a discussion of partitioning planes is provided in commonly owned U.S. Pat. No. 9,035,946, which is incorporated herein by reference for all purposes.

Figure 1D:
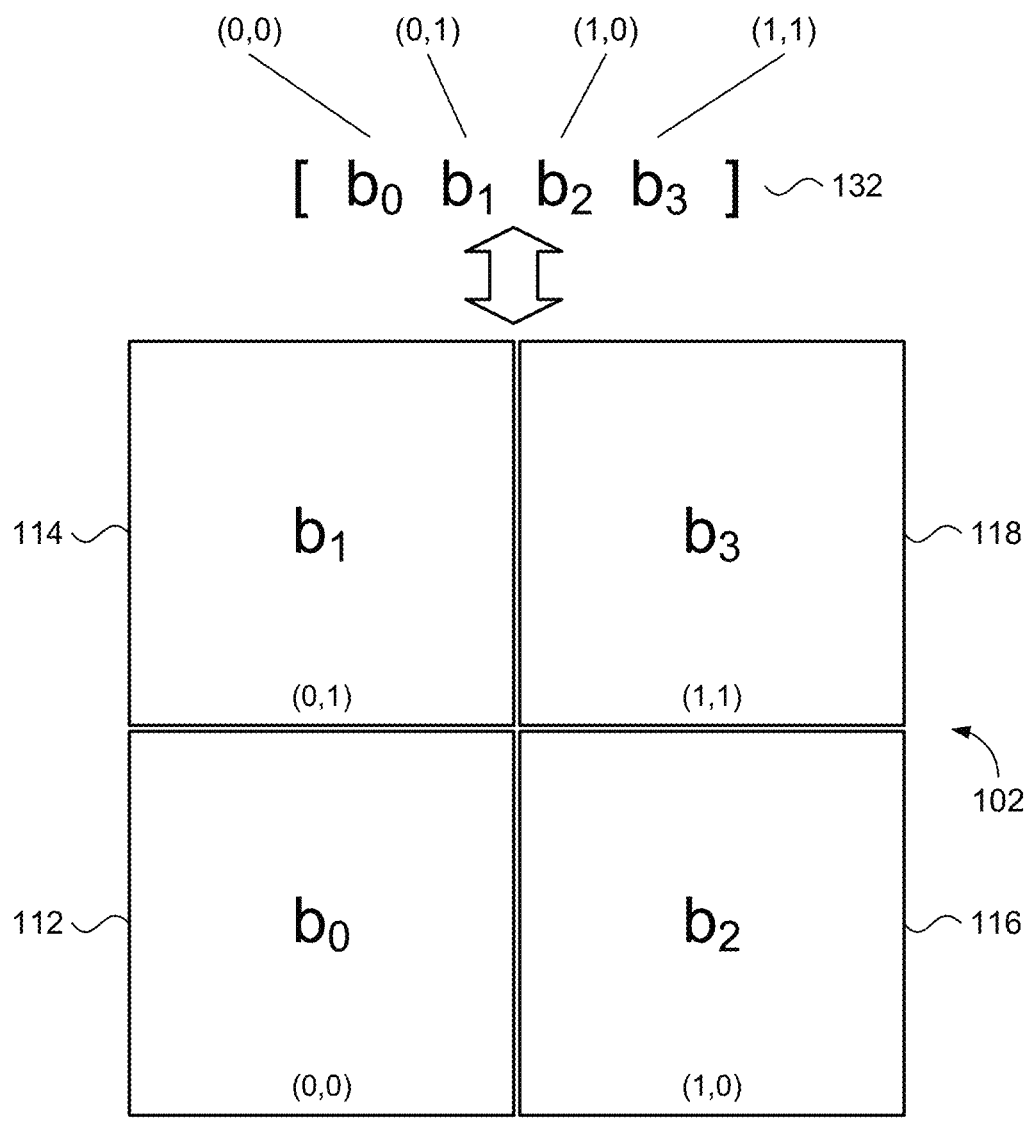
FIG. 1D illustrates the idea of bitmaps in accordance with the present disclosure.
Figure 1E:
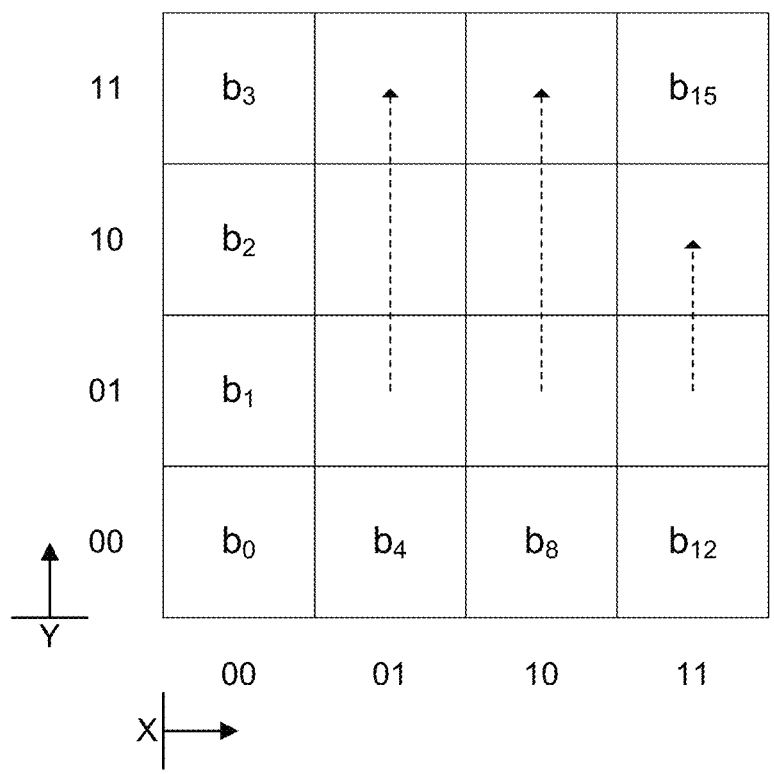
FIG. 1E shows a cell numbering convention in accordance with some embodiments.

In accordance with the present disclosure, the cells that comprise a grid can be represented by a bitmap comprising an array of bits that correspond to the cells. Referring to FIG. 1D, for example, the cells in grid 102 can be represented by bitmap 132. The bit position of each bit $b_0$, $b_1$, $b_2$, $b_3$ in the bitmap 132 corresponds one-to-one with respective cells 112, 114, 116, 118 in the grid 102. Thus, bit $b_0$ in bitmap 132 corresponds (or maps) to the cell at address (0, 0) in the grid 102, bit $b_1$ corresponds to the cell at address (0, 1), bit $b_2$ corresponds to the cell at address (1, 0), and bit $b_3$ corresponds to the cell at address (1, 1). The number of bits in the bitmap depends on the resolution of the grid. The grid in FIG. 1D, for example, is a 2×2 grid and so the bitmap comprises four bits. In general, a n×m grid (not shown) will have a bitmap comprising n×m bits. FIG. 1E shows an example of the cell numbering for a 4×4 grid and the corresponding 16-bit bitmap, illustrating how the cell numbering convention used herein can be extended to higher resolution grids.

Figure 1F:
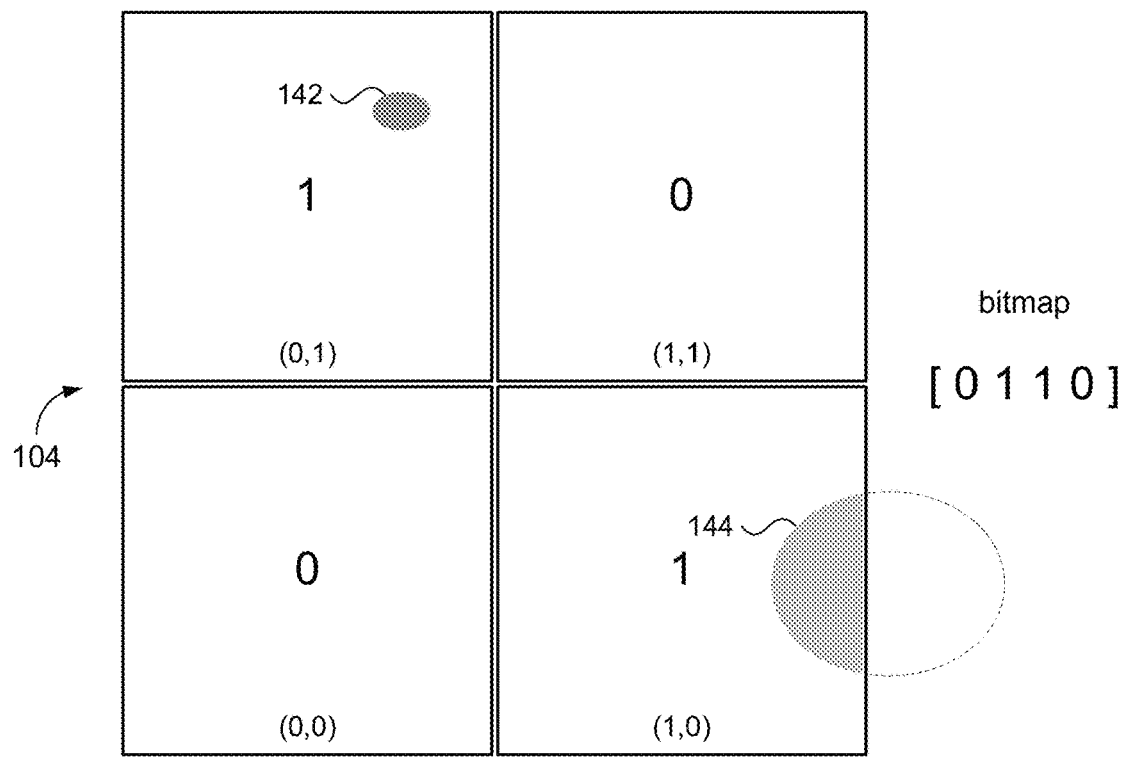
FIGS. 1F, and 1G illustrate further aspects of bitmaps in accordance with the present disclosure.
Figure 1G:
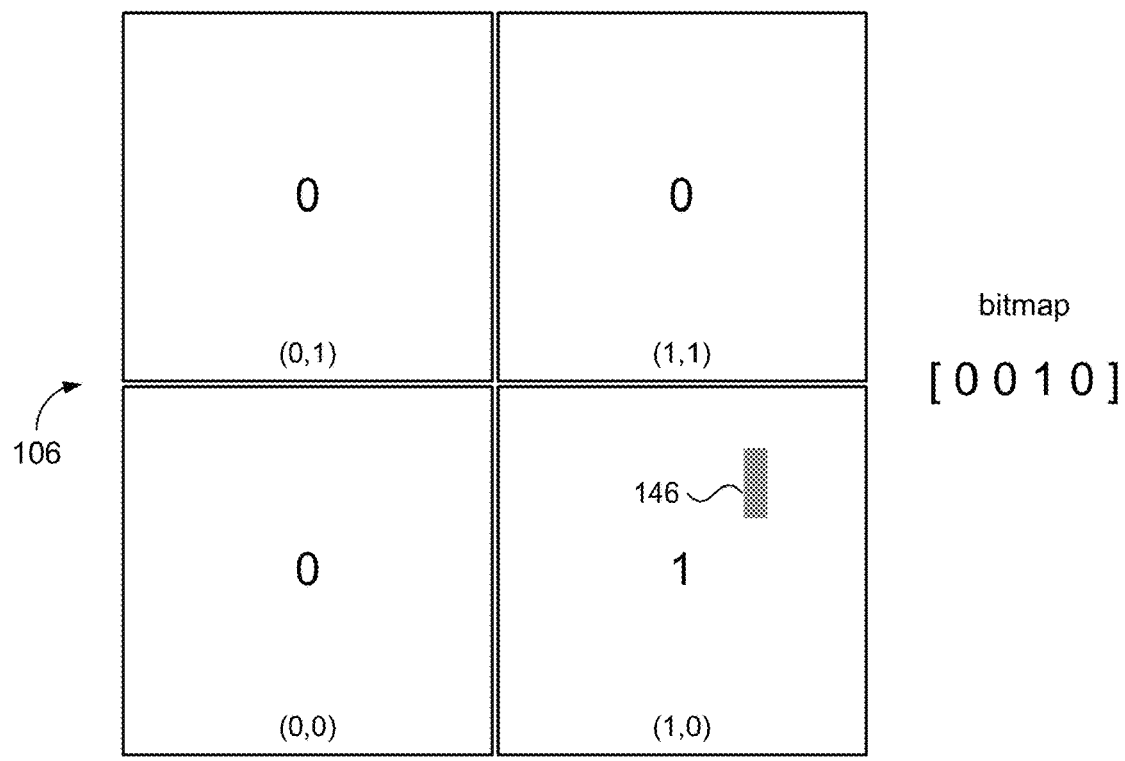

A cell can be marked or designated as being "dirty" or "clean." In some aspects of the present disclosure, a cell is deemed to be dirty if that cell contains a primitive object or a portion of a primitive object, the cell is deemed to be clean otherwise. Referring to FIG. 1F, for example, the cell at address (0, 1) in grid 104 is dirty because the cell contains a primitive object 142. Likewise, the cell at address (1, 0) is also designated as dirty because it contains a portion of a primitive object 144; the other two cells (at (0,0) and (1,1)) are deemed to be clean. In some embodiments, dirty cells in a grid can be represented by setting or clearing their corresponding bits in the bitmap for that grid. As used herein, for example, a '1' bit will indicate the cell is dirty, while a '0' bit indicates the cell is clean. Thus, for example, the bitmap for grid 104 is [0 1 1 0]. As another example, FIG. 1G shows a grid 106, where the cell at address (1, 0) contains a primitive object 146, and so the bitmap looks like [0 0 1 0].

Any cell that is partitioned into a grid of cells can be associated with a bitmap comprising an array of bits that correspond to the cells in the grid. Thus, for example, the scene 10 in FIG. 1A can be represented by a bitmap if the scene 10 is partitioned into a grid of cells (as shown in FIG. 1B, for example). A cell in a grid of cells, in turn, can be associated with a bitmap if that cell is partitioned into a grid of cells. FIG. 1C, for example, shows that cell 112 is partitioned into a grid of cells 112', and so on. As will be discussed below, bitmaps can be used with bounding volumes as well as objects.

The examples above assume a 2D scene. One of skill will readily appreciate that the foregoing can be adapted for 3D scenes, where the "cells" are cubes. For example, the world coordinate for a 3D scene would comprise three axes: X, Y, and Z. A grid in the 3D scene (sometimes referred to as a "bounding cube") can be subdivided into cubes (sometimes referred to as "voxels"). For example, a 2×2×2 partitioning of a level n cube would result in eight level n+1 cubes, thus defining an octree hierarchy. In a 2×2×2 partitioning configuration, each 3D grid would be represented by an eight-bit bitmap to represent the eight constituent cells of that grid. The cell address of each cell would comprise a three-bit value (an X-address component, a Y-address component, and a Z-address component) to uniquely identify each of the eight cell positions in the 3D grid. To simplify the discussion, however, the remainder of the disclosure will assume a 2D scene.

Figure 2:
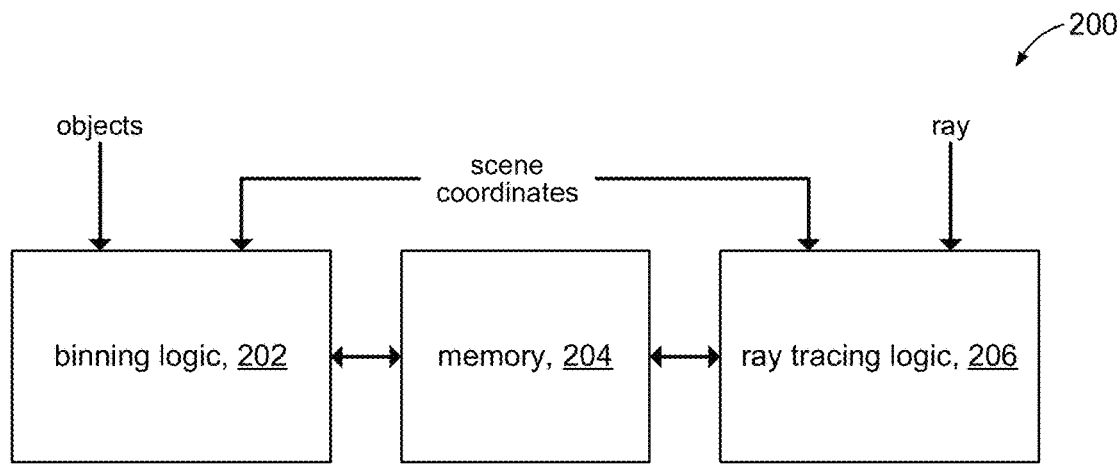
FIG. 2 is a high level block diagram of a system for ray tracing in accordance with the present disclosure.

FIG. 2 is a high level block diagram of a system 200 for ray tracing in accordance with the present disclosure. In some embodiments, the system 200 can include binning logic 202 to perform binning of geometric objects comprising a scene to corresponding bounding volumes. The binning logic 202 can include inputs to receive data that describes objects for binning and scene coordinates. The binning logic 202 can be configured to define bounding volumes and bin geometric objects to those bounding volumes. A memory 204 can store information relating to the geometric objects, the scene, and the bounding volumes. The memory 204 can also store the binning of geometric objects to the bounding volumes. Ray tracing logic 206 can read from memory 204 to perform ray tracing using the binning information generated by the binning logic 202. The ray tracing logic 206 can include inputs to receive information that represent a ray and the scene coordinates. In accordance with some embodiments, the logic circuits disclosed herein can be implemented on any suitable hardware platform such as field programmable gate arrays (FPGAs), application specific ICs (ASICs), and the like, including different combinations of hardware platforms, and so on.

Figure 3:
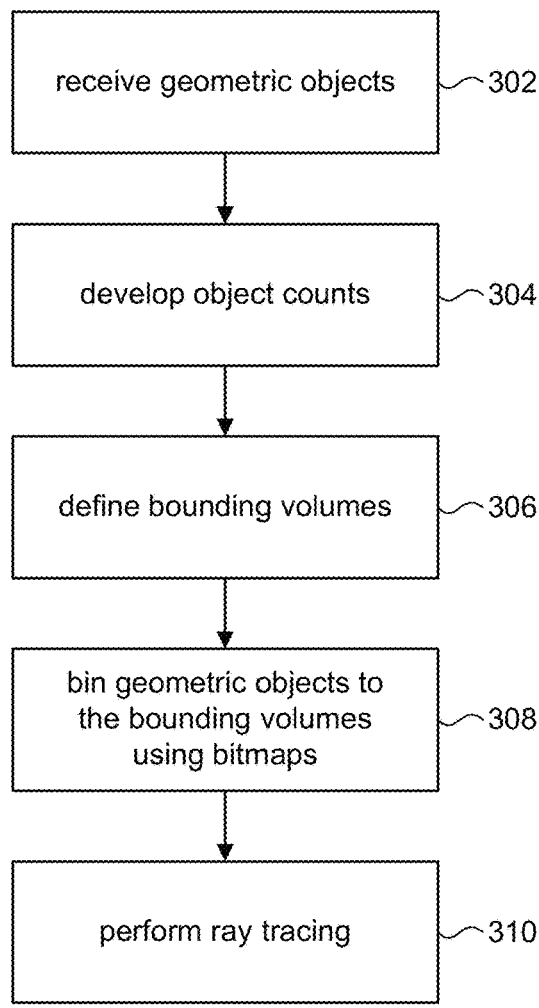
FIG. 3 is a high level flow of operations to process ray tracing in accordance with the present disclosure.

FIG. 3 shows a high level flow of operations for ray tracing in accordance with some embodiments of the present disclosure. The operations shown in FIG. 3 are explained as a series of processing steps. In accordance with the present disclosure, the processing can be performed in parallel fashion using suitably configured logic circuits, which in various embodiments can be implemented on any suitable hardware platform such as field programmable gate arrays (FPGAs), application specific ICs (ASICs), and the like, including different combinations of hardware platforms, and so on. The flow of operations is not necessarily limited to the order shown.

At block 302, the processing logic can receive a plurality of primitive geometric objects ("objects"). The elements that constitute a scene can be decomposed into primitive geometric objects, which can then be processed for intersection by rays. Objects can be any elementary shape (e.g., triangle, rectilinear shapes, circles, spheres, cylinders, and other polygons), and in some embodiments can be complex shapes such as parametric surfaces, swept surfaces, and so on. The set of objects that comprise a scene can include combinations of different shapes and sizes.

At block 304, the processing logic can develop object counts. In some embodiments, each object that is entirely contained in a bounding volume (e.g. 142, FIG. 1F), or partially (e.g. 144, FIG. 1F), will contribute a count of one to that bounding volume's object count. In some embodiments, for example, the counting can proceed in accordance with the triangle binning engine disclosed in commonly owned U.S. Pat. No. 9,035,946. For example, all triangles can go thru an initial pass where they are tested against many different sized cells at different grid resolutions. Object counters for each of these spatial volumes would be incremented for each object determined to be inside it. In some embodiments, object counts can be determined for cells at each grid resolution.

At block 306, the processing logic can define bounding volumes. In accordance with some embodiments, the scene can be partitioned into a hierarchy of bounding volumes. This aspect of the present disclosure is discussed in more detail below.

At block 308, the processing logic can bin or otherwise associate objects to bounding volumes. In some embodiments, for example, each bounding volume can be linked to or otherwise associated with a list of objects that the bounding volume wholly or partially overlaps with. In accordance with the present disclosure, the objects can be binned to bounding volumes using bitmaps that represent the bounding volumes and bitmaps that represent the objects. This aspect of the present disclosure is discussed in more detail below.

At block 310, the processing logic can perform ray tracing through the scene to simulate the interaction of light with elements in the scene. Ray tracing involves tracing the path of light as it bounces around the scene, and computing the interactions between the rays and the objects that constitute the scene elements. In some embodiments, the ray tracing process first includes identifying bounding volumes that are intersected by the ray, and then identifying objects binned to those bounding volumes that are intersected by the ray. The binning of objects to the bounding volumes (block 308) in accordance with the present disclosure uses an acceleration structure that improves the speed of the ray tracing process and hence the overall rendering process.

Figure 4:
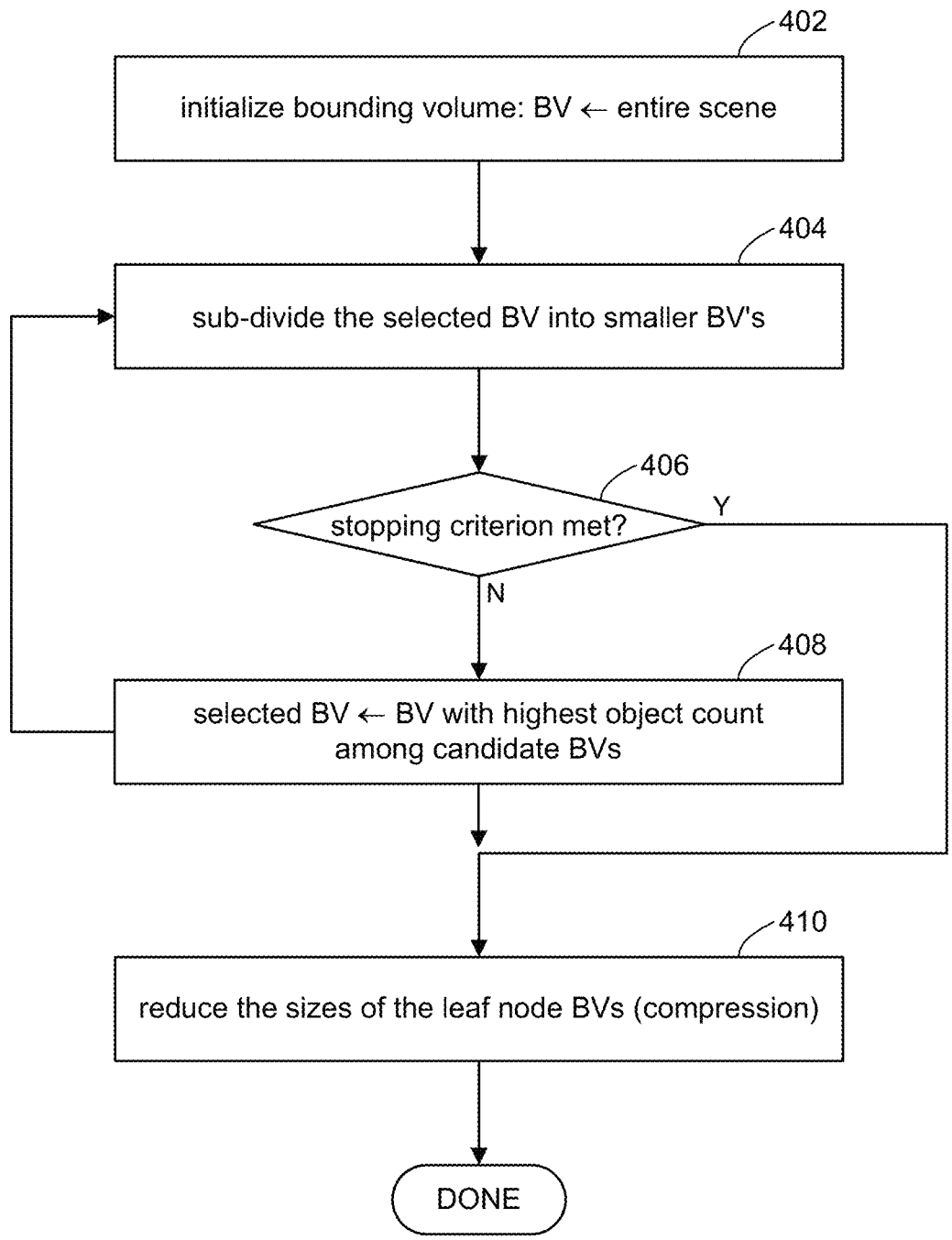
FIG. 4 describes a flow for defining a bounding volume hierarchy in accordance with the present disclosure.

FIG. 4 illustrates processing in accordance with some embodiments of the present disclosure to define the bounding volumes for a scene by successively splitting the scene. In some embodiments, the scene can be sub-divided in a hierarchical manner to define a hierarchy of bounding volumes (BVs). The processing described in FIG. 4 is demonstrated in FIGS. 5A-5F with an example of a scene 52 comprising a count of 120 objects, and in FIGS. 6A-6F with an example of a hierarchy 602 of bounding volumes (referred to as a bounding volume hierarchy or a "BV tree"). The processing shown in FIG. 4 is explained as a series of processing steps. In accordance with the present disclosure, the processing can be performed in parallel fashion using suitably configured logic circuits which in various embodiments can be implemented on any suitable hardware platform such as field programmable gate arrays (FPGAs), application specific ICs (ASICs), and the like, including different combinations of hardware platforms, and so on. The flow of operations is not necessarily limited to the order shown.

At block 402, the processing logic can initialize the first bounding volume to be the bounding volume at the root of the BV tree. The bounding volume at the root of the BV tree contains all the objects in the scene; in other words, the bounding volume at the root represents the entire scene. Accordingly, the first BV can be the entire scene. FIG. 5A, for example, shows a bounding volume 502 defined by a scene 52 (having 120 objects). The bounding volume 502 is designated as the (one) bounding volume at the beginning of this process. The BV tree 602 shown in FIG. 6A initially comprises only the root node, which represents the one bounding volume 502. As used herein, the terms "node" and "bounding volume" can be used interchangeably when referring to a BV tree; the nodes in the BV tree represent bounding volumes and vice versa.

At block 404, the processing logic can sub-divide the selected BV into smaller bounding volumes. In some embodiments, for example, the subdivisions can be uniform to produce smaller bounding volumes of n×m cells at the next higher grid resolution, where n and m can be the same or different values and can be any non-zero integer values. In some embodiments, n and m can be the same from one level in the BV tree to the next. In other embodiments, n and m can be can be selected depending on the level in the BV tree being processed. The examples in FIGS. 5A-5F will assume without loss of generality, that cells are partitioned into 2×2 grids at each level in the hierarchy. For purposes of discussion, bounding volumes can be defined on cell boundaries (although this is not necessary) and so bounding volumes and cells can be used interchangeably.

The sub-dividing criteria can simply be to divide the selected bounding volume into equally-sized smaller bounding volumes of n×m cells. In other embodiments, the smaller bounding volumes can be of different sizes. The smaller bounding volumes can have shapes other than rectangular, and so on. The sub-dividing criteria can be based on reducing surface area. The examples in FIGS. 5A-5F will assume without loss of generality, that a selected BV is sub-divided to create equally-sized smaller bounding volumes.

At block 406, the processing logic can make a determination whether one or more stopping criteria have been met. In some embodiments, for example, a predetermined maximum number of bounding volumes can serve as a stopping criterion. In other words, when the total number of bounding volumes defined by the processing of FIG. 4 reaches a predetermined maximum number of bounding volumes, the process can stop and proceed to block 410. It will be appreciated, of course, that any suitable criteria can be used to stop the process. The examples used in FIGS. 5A-5F and 6A-6F, for instance, use a stopping criterion of a maximum of eight leaf nods in the BV tree.

Processing can stop if none of the bounding volumes can be further sub-divided. In some embodiments, only those bounding volumes at the leaf nodes in the BV tree are considered to be possible candidate BVs for sub-dividing. Since bounding volumes at the intermediate nodes (e.g., nodes with dashed lines in FIGS. 6B-6F) have already been sub-divided, the process only considers bounding volumes in the leaf nodes to sub-divided. Bounding volumes that are already at the highest grid resolution relative to the whole scene 52 (in our example, the highest grid resolution is 8×8) will not be further divided. If the selected bounding volume cannot be sub-dived, then the process of defining bounding volumes can be deemed complete and processing can proceed to block 410; otherwise, processing can continue to block 408.

At block 408, the BV having the largest object count can be chosen as the next selected BV, and processing can return to block 404 for another iteration of processing using the selected BV. Referring to FIG. 5B, the example shows the scene 52 is sub-divided into bounding volumes 512a, 512b, 512c, where bounding volume 512a contains 30 objects, bounding volume 512b contains 20 objects, and bounding volume 512c contains 70 objects. The bounding volume 512c would be the next selected BV in the process. The BV tree 602 shown in FIG. 6B reflects the bounding volumes 512a, 512b, 512c as children nodes with their respective object counts.

Figure 5D:
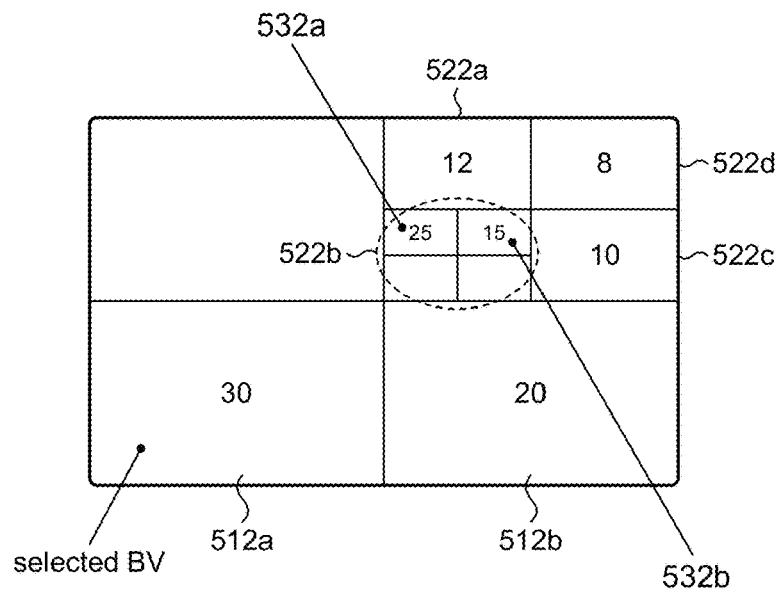

Refer for a moment to FIGS. 5B-5E and FIGS. 6B-6E for an illustration of the process described so far. Referring to FIG. 5B, the bounding volume 512c can be chosen as the next selected BV (it is a leaf node that is not at the highest grid resolution, and has the highest object count). FIG. 5C shows that sub-dividing the bounding volume 512c into a 2×2 grid of cells produces four smaller bounding volumes 522a, 522b, 522c, 522d (at a grid resolution of 4×4 relative to the whole scene 52) having, for example, respective object counts of 12, 40, 10, and 8. The BV tree 602 shown in FIG. 6C reflects the new bounding volumes 522a, 522b, 522c, 522d as children nodes of bounding volume 512c. The leaf nodes in the BV tree correspond to bounding volumes 512a, 512b, 522a, 522b, 522c, and 522d (as indicated by the object counts). The sub-dividing process repeats with bounding volume 522b, since it is not at the highest grid resolution and has the highest object count (40) among the candidate BVs 512a, 512b, 522a, 522b, 522c, 522d.

Figure 6D:
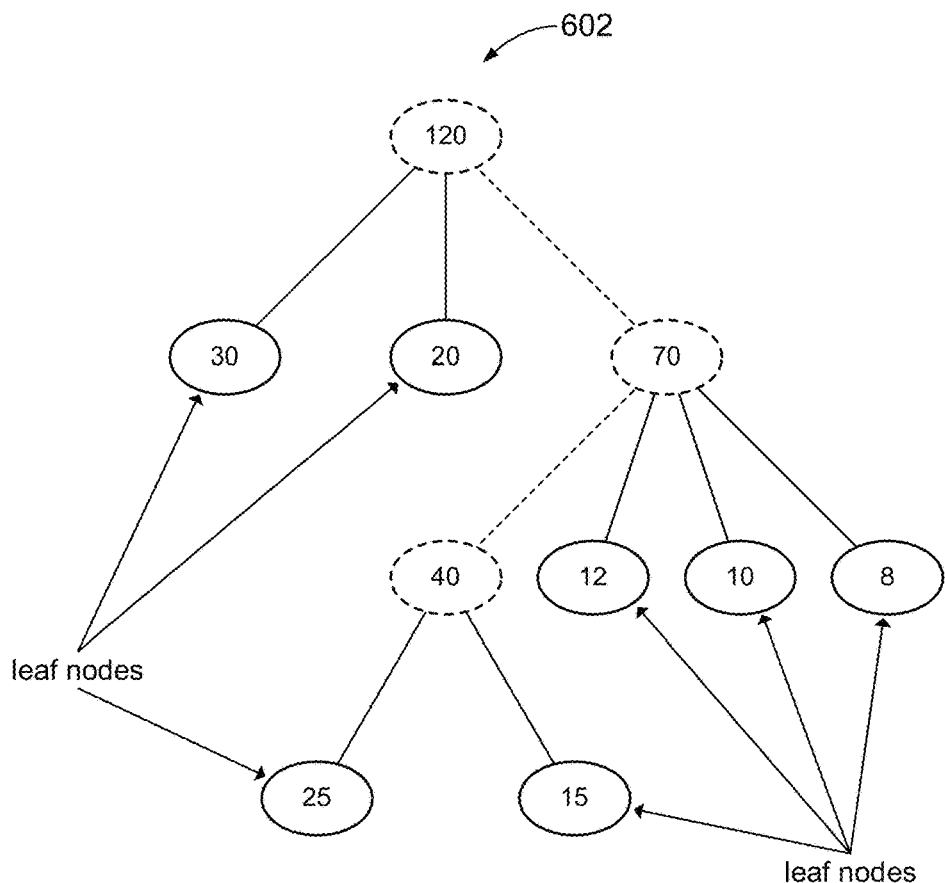

FIG. 5D shows an example of the result of sub-dividing bounding volume 522b, along with the corresponding BV tree 602 shown in FIG. 6D. The bounding volume 522b is shown sub-divided into a 2×2 grid of cells at a grid resolution of 8×8. The example in FIG. 5D shows two bounding volumes 532a, 532b having respective object counts of 25 and 15. Assuming a highest grid resolution of 8×8, bounding volumes 532a, 532b will not be considered candidate BVs for the next selected BV. The candidate BVs at this point include bounding volumes 512*a*, 512*b*, 522*a*, 522*c*, 522*d*. Accordingly, the next selected BV is bounding volume 512*a*.

Figure 5E:
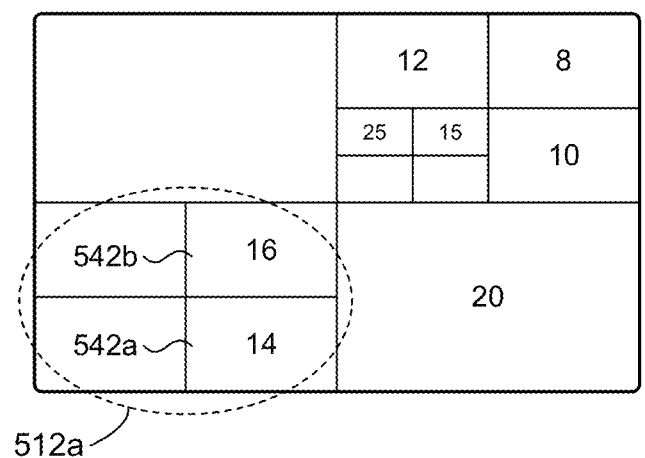
Figure 6E:
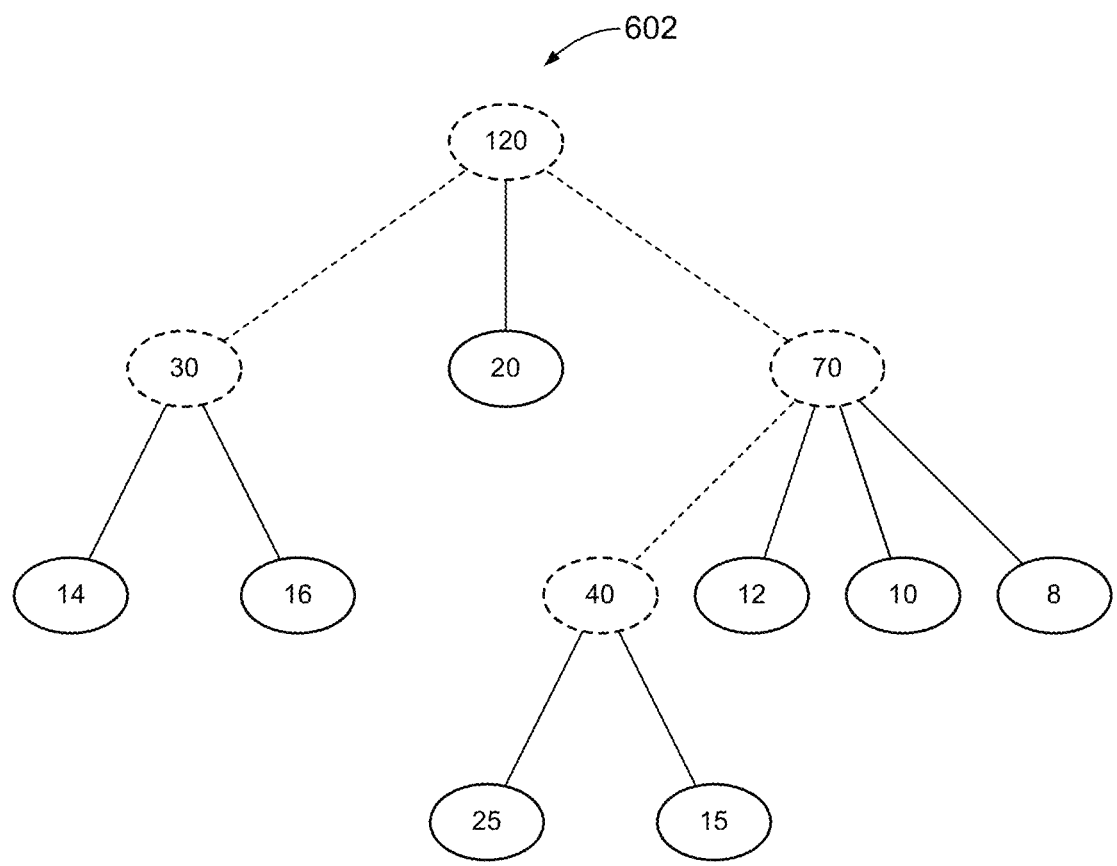

FIG. 5E shows an example of the result of sub-dividing bounding volume 512*a*, along with the corresponding resulting BV tree 602 shown in FIG. 6E. The bounding volume 512*a* is shown sub-divided into a 2×2 grid of cells at a resulting grid resolution of 4×4 relative to the whole scene 52. The example in FIG. 5E shows two bounding volumes 542*a*, 542*b* having respective object counts of 14 and 16. At this point in the process, the number of leaf node bounding volumes in the BV tree 602 in FIG. 6E is eight, which is the stopping criterion for our example. Accordingly, processing from block 408 can proceed to block 410. As an observation, it is noted that the bounding volumes containing 25 objects and 15 objects would not be candidate BVs if the stopping criteria had not been met because they are at the highest grid resolution (8×8) and so would not be further partitioned.

It will be appreciated that in other embodiments, the selected BV can be chose based on any suitable criteria. For example, the bounding volume with the largest area or volume can be the selected BV. The bounding volume with the largest density of objects can be the selected BV, and so on.

Figures 5F, 6F:
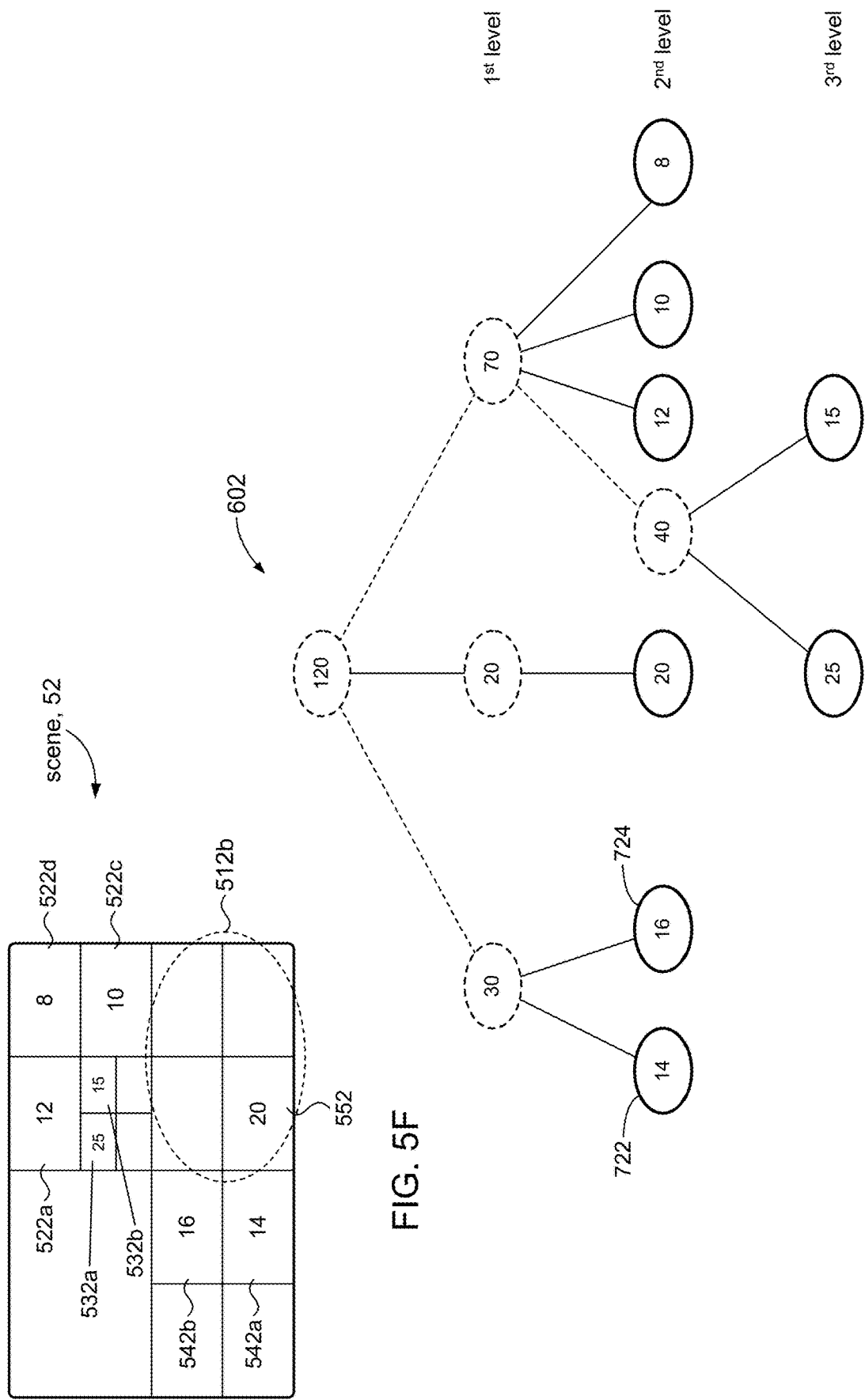

Continuing with FIG. 4, at block 410, although the process of defining bounding volumes can be deemed complete, the process can include a further operation to reduce the sizes (e.g., area, volume) of certain bounding volumes at the leaf nodes in the BV tree. In some embodiments, for example, if the objects in a leaf node bounding volume can be contained in a higher resolution cell, that bounding volume can be reduced or compressed. Referring to FIG. 5F, for example, suppose the objects in bounding volume 512*b* (a 2×2 resolution cell) can be contained in a higher resolution cell 552 (e.g., a 4×4 resolution cell). In such a situation, the size of the bounding volume can be reduce. In some embodiments, for example, reducing the size of a bounding volume can include moving the boundaries of that bounding volume toward each other until they each reach but do not cross any objects contained in that bounding volume. The boundaries of the resulting reduced bounding volume can then be "snapped" to the coordinates of a cell at the highest grid resolution (relative to the whole scene 52) that contains the reduced bounding volume. Bounding volume 552 in FIG. 5F represents an example of a result of the reduction process.

Figure 6G:
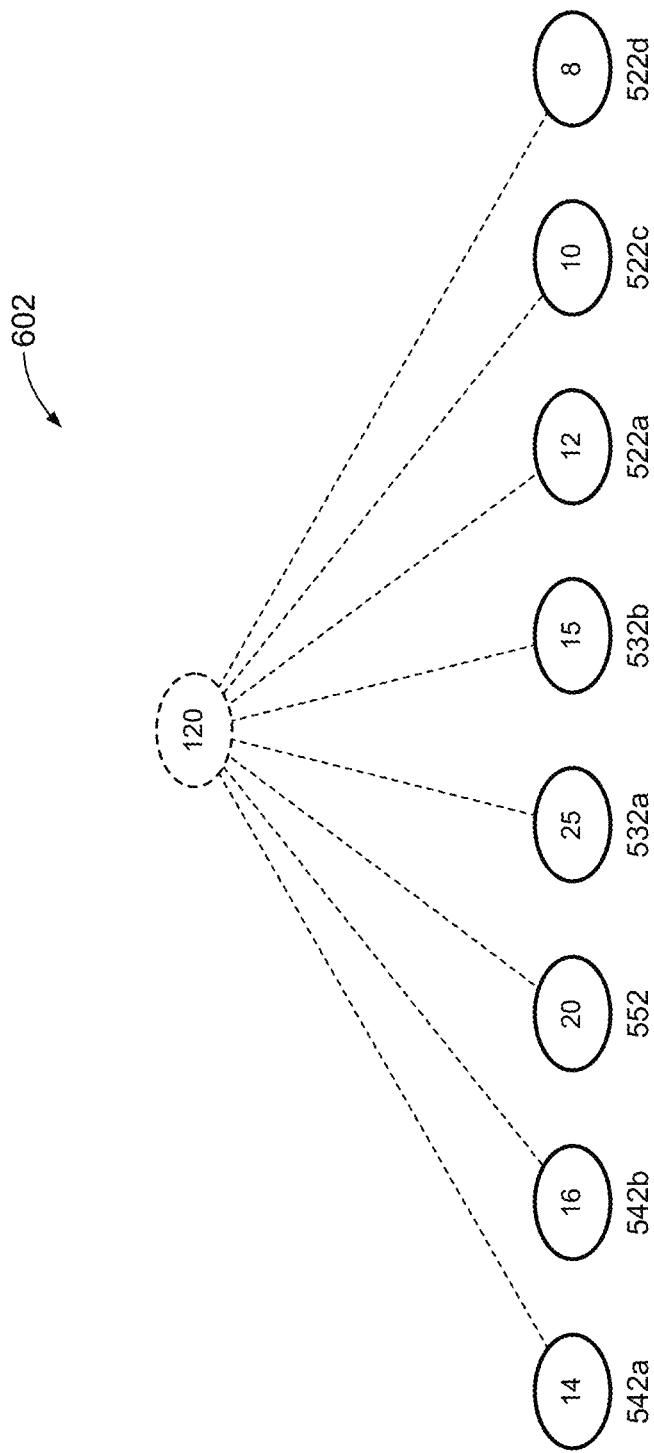
FIG. 6G illustrates a flattened representation of the BV tree 602.

The BV tree 602 shown in FIG. 6F represents the final set of bounding volumes from the processing of FIG. 4. In accordance with the present disclosure, the BV tree 602 can be "flattened" so that only the bounding volumes in the leaf nodes are considered when binning the geometric objects to the bounding volumes (block 308, FIG. 3), which is discussed in more detail below. FIG. 6G depicts a flattened representation of the BV tree 602, illustrating that embodiments in accordance with the present disclosure can ignore the BV hierarchy, and focus only on the leaf nodes. In the example of FIG. 5F, for instance, the set of flattened bounding volumes includes bounding volumes 522*a*, 522*c*, 522*d*, 532*a*, 532*b*, 542*a*, 542*b*, and 552. It will be appreciated that in various instances, the number of leaf nodes can be 512, 1024, and so on.

In some instances, the entire BV tree can be defined by processing the scene in a single round of processing per FIG. 4. In other instances, a BV tree may be defined by processing the scene in two or more rounds of processing per FIG. 4. Making multiple rounds may be suitable, for example, to define a hierarchy that has many levels and a high grid resolution at each level. For example, a four level hierarchy with a grid resolution of 64×64 cells at each level yields $64^8$ leaf nodes (for a 2D scene), so defining the BV tree in two or more rounds of FIG. 4 may be suitable. Multiple rounds may also be suitable if the scene comprises a vary large number of objects.

Figure 7:
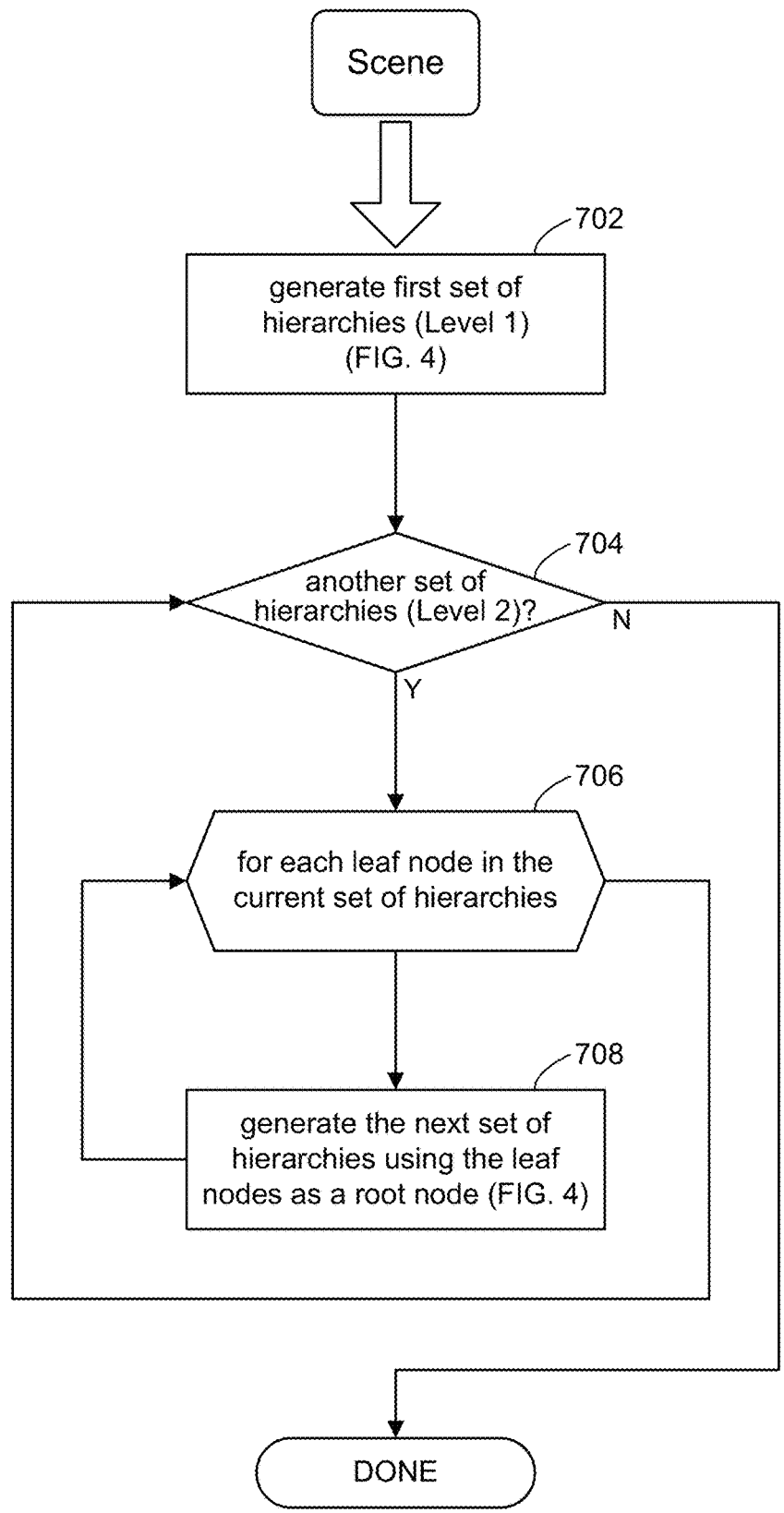
FIG. 7 illustrates an alternative flow for defining a bounding volume hierarchy.
Figure 8:
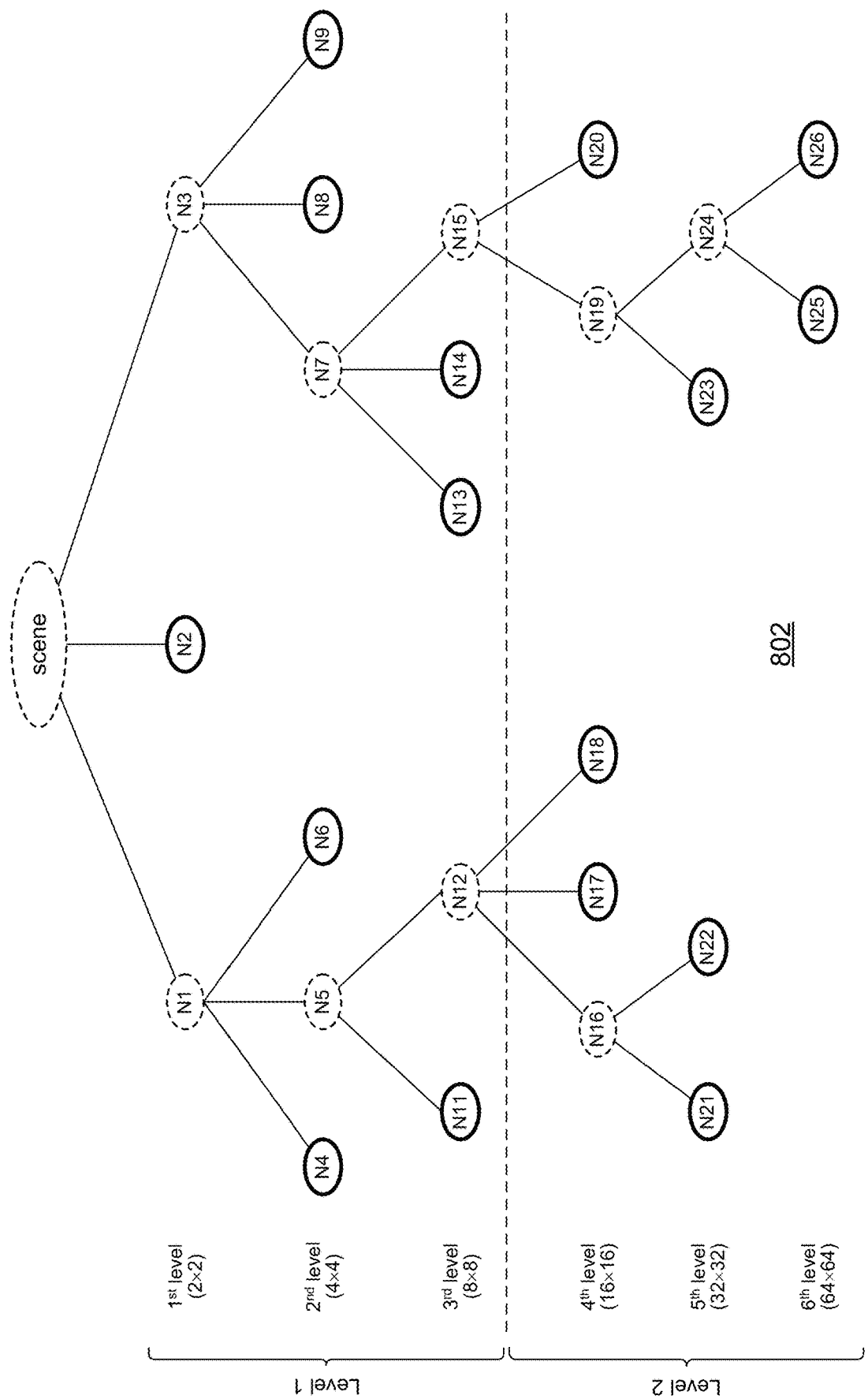
FIG. 8 shows another example of a bounding volume hierarchy (tree) developed in accordance with the operations of FIG. 4.

FIG. 7 illustrates processing in accordance with some embodiments of the present disclosure to define a BV tree by processing the scene in two or more rounds of processing per FIG. 4. The BV tree 802 depicted in FIG. 8 illustrates an example. The processing shown in FIG. 7 is explained as a series of processing steps. In accordance with the present disclosure, the processing can be performed in parallel fashion using suitably configured logic circuits, which in some embodiments can be implemented on any suitable hardware platform such as field programmable gate arrays (FPGAs), application specific ICs (ASICs), and the like, including different combinations of hardware platforms, and so on. The flow of operations is not necessarily limited to the order shown.

At block 702, the processing logic can include identifying the initial BV tree by performing a first round of processing per FIG. 4 on a scene. Suppose, for example, that the first round of processing produces the first three levels of the BV tree 802 shown in FIG. 8. The set comprising levels 1, 2, and 3 in BV tree 802 can be referred to as the "Level 1" hierarchies.

At block 704, if another set of hierarchies (e.g., Level 2 hierarchies) is desired, then processing can proceed to block 706. Otherwise, processing can be deemed complete.

At block 706, the processing logic can include extending the BV tree 802 to define another set of levels of hierarchy in BV tree 802 by processing each leaf node in the current set of hierarchies per FIG. 4.

At block 708, the processing logic to generate the next set of hierarchies (e.g., Level 2) using a leaf node in the current set of hierarchies as the root node for that next set of hierarchies. Referring to the example in FIG. 8, for instance, the processing of FIG. 4 can be applied to the leaf node N12 to define a sub-tree of nodes in Level 2 rooted at N12. Likewise, the processing in FIG. 4 can be repeated on node N15 to define a sub-tree of Level 2 nodes that descend from node N15, and so on. The same stopping criteria (block 408) can be used for each of the Level 1 and Level 2 hierarchies, or the stopping criteria may be different. The process can loop back to block 704 to define yet another set of hierarchies. In our example, we stop at the Level 2 hierarchies, but it will be appreciated that the process and continue to define additional levels of hierarchy (e.g., Level 3, Level 4, and so on).

FIG. 9A illustrates processing in accordance with some embodiments of the present disclosure to bin objects to the bounding volumes (defined, for example, by the process in FIG. 4 or 7). FIG. 9A provides a high level description of the process of object binning in accordance with some embodiments of the present disclosure. The processing shown in FIG. 9A is explained as a series of processing steps. In accordance with the present disclosure, the processing can be performed in parallel fashion using suitably configured logic circuits, which in some embodiments can be implemented on any suitable hardware platform such as field programmable gate arrays (FPGAs), application specific ICs (ASICs), and the like, including different combinations of hardware platforms, and so on. The flow of operations is not necessarily limited to the order shown.

At block 902, the processing logic can process each object to bin the object to one or more bounding volumes. Generally, an object is "binned" or otherwise associated with a given bounding volume if the given bounding volume entirely or partially overlaps with the object. Binning an object in accordance with the present disclosure can begin at block 904.

At block 904, the processing logic can generate BV bitmaps for each of the bounding volumes (leaf nodes) in a BV tree (e.g., 602, FIG. 6). As explained above, a bitmap is associated with a grid of cells a given resolution. In accordance with the present disclosure, each bounding volume can be associated with a BV bitmap for each defined grid resolution. In our example, where there are three resolutions, 2×2, 4×4, and 8×8, each bounding volume can be associated with three BV bitmaps: a four-bit bitmap for the 2×2 grid, a 16-bit bitmap for the 4×4 grid, and a 64-bit bitmap for the 8×8 grid. A BV bitmap for a bounding volume at a given grid resolution identifies the cells, at that grid resolution, which entirely or partially overlap with the bounding volume. In some embodiments, the bits in a BV bitmap that correspond to cells that entirely or partially overlap with the bounding volume can be referred to as "dirty bits" and are set (e.g., logic '1'), while bits that correspond to cells that do not overlap with the bounding volume are reset (e.g., logic '0').

Figure 10A:
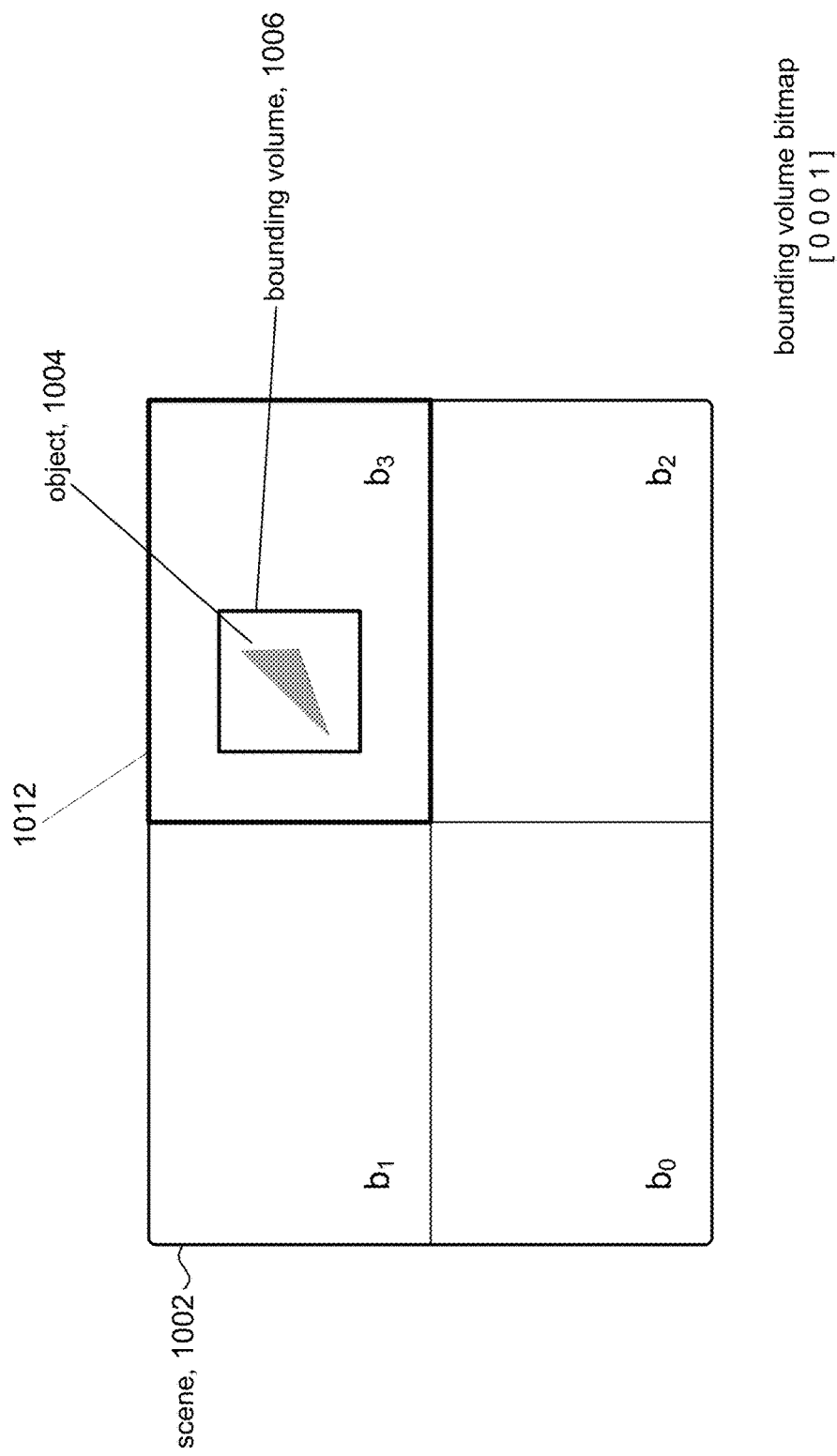
FIGS. 10A, 10B, and 10C illustrate examples of bitmaps for a bounding volume at different grid resolutions.
Figure 10B:
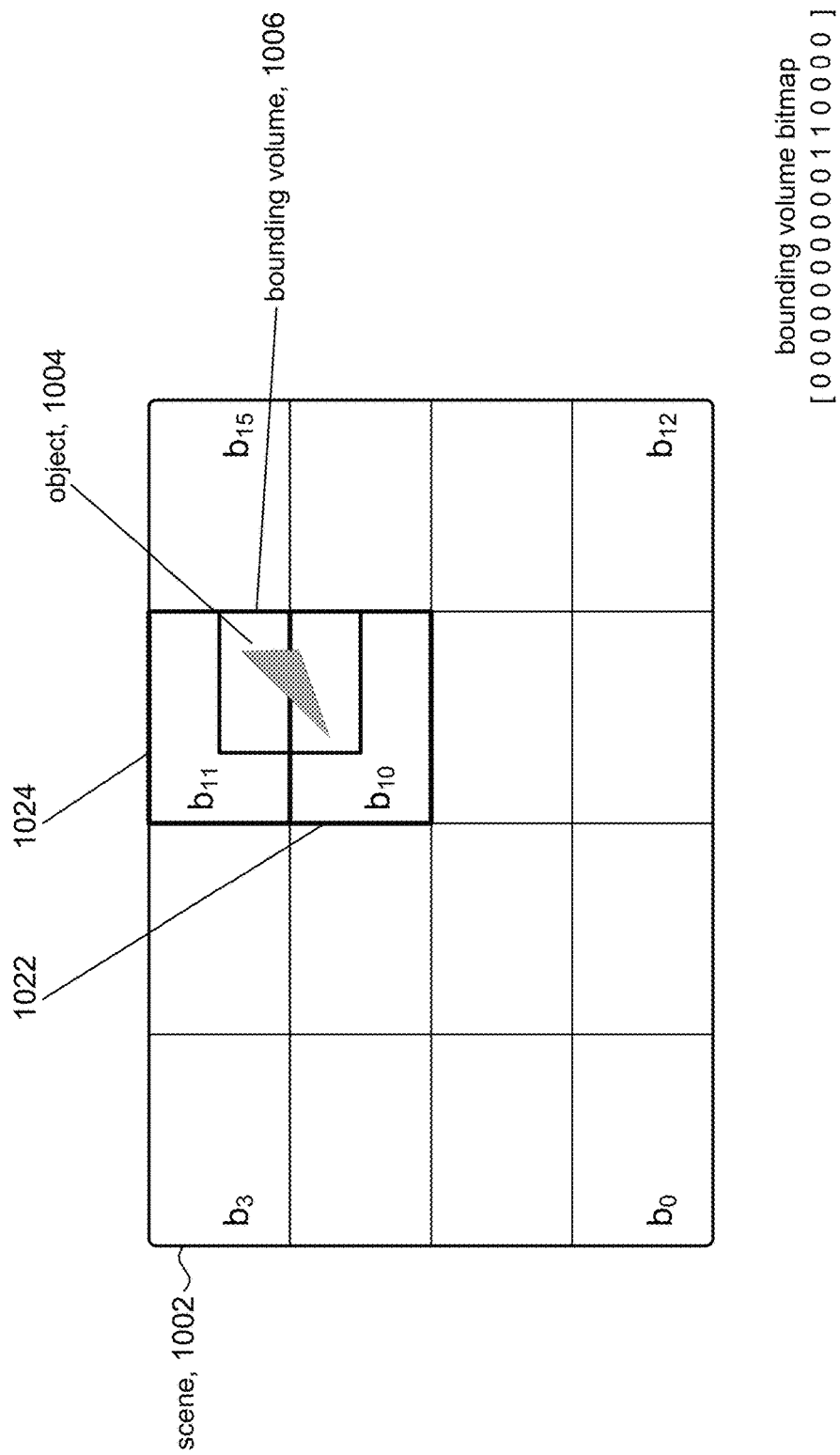
Figure 10C:
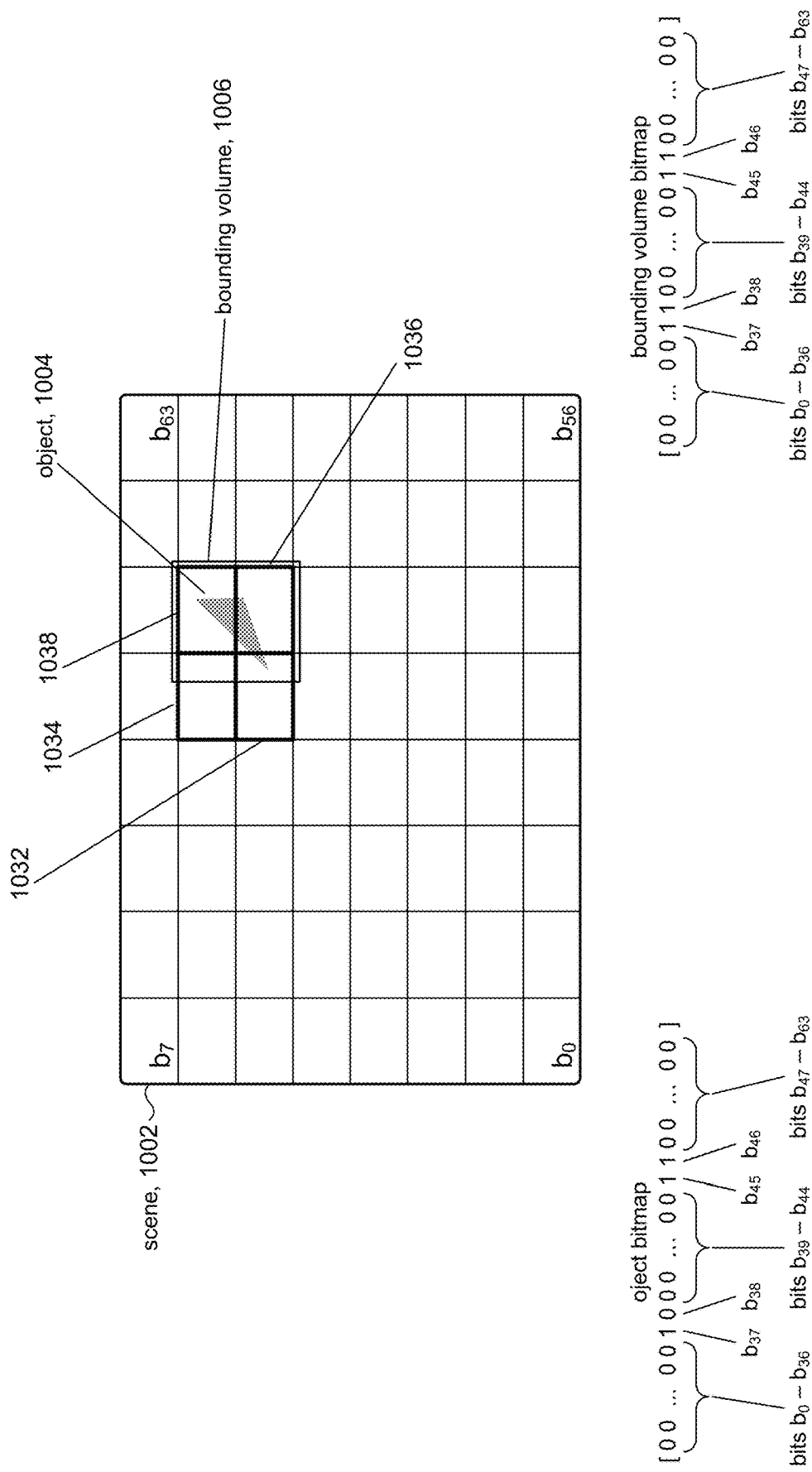

Referring for a moment to the scene 1002 shown in FIGS. 10A-10C. Consider the object 1004 and bounding volume 1006. FIG. 10A shows the scene 1002 at a 2×2 grid resolution. The bounding volume 1006 at the 2×2 grid resolution is wholly contained in cell 1012, and the four-bit BV bitmap for the bounding volume 1006 is [ 0 0 0 1] (using the cell numbering convention shown in FIG. 1E). FIG. 10B shows the scene 1002 at a 4×4 grid resolution. The 4×4 resolution cells 1022, 1024 each partially contain the bounding volume 1006, and so its 16-bit BV bitmap is [0000 0000 0011 0000]. FIG. 10C shows the scene 1002 at a 8×8 grid resolution. The 8×8 resolution cells 1032, 1034, 1036, 1038 each partially contain the bounding volume 1006, and so the dirty bits in its 64-bit bitmap are bits $b_{37}$, $b_{38}$, $b_{45}$, $b_{46}$.

Continuing with FIG. 9A, at block 906, the processing logic can include generating an object bitmap for the object comprising the scene. The object bitmap is similar to the BV bitmap described above. In accordance with the present disclosure, the object is associated with an object bitmap at each defined grid resolution. In our example, where there are three resolutions, 2×2, 4×4, and 8×8, the object would be associated with three object bitmaps: a four-bit bitmap for the 2×2 grid, a 16-bit bitmap for the 4×4 grid, and a 64-bit bitmap for the 8×8 grid. An object bitmap for a bounding volume at a given grid resolution identifies the cells, at that grid resolution, which entirely or partially overlap with the object. Bits in an object bitmap that correspond to cells that entirely or partially overlap with the object can be referred to as "dirty bits" and are set (e.g., logic '1'), while bits that correspond to cells that do not overlap with the object are reset (e.g., logic '0').

Referring again to the examples, in FIGS. 10A-10C, in FIG. 10A we can see that the object bitmap for object 1004 is the same as the BV bitmap for bounding volume 1006, because the object 1004 is wholly contained in the 2×2 resolution cell 1012. Likewise, in FIG. 10B, the object bitmap for object 1004 and the BV bitmap for bounding volume 1006 are the same, because the object 1004 is partially contained in the 4×4 resolution cells 1022, 1024. In FIG. 10C, the object 1004 overlaps only cells 1032, 1036, 1038, and so the dirty bits in its 64-bit bitmap are bits $b_{37}$, $b_{45}$, $b_{46}$.

At block 908, the processing logic can compare the object bitmap with the bitmap of each of the bounding volumes. In some embodiments, the comparison can be a bitwise comparison, and in particular can be a bitwise logical AND of corresponding bits between the object bitmap and the BV bitmap of a bounding volume, to produce a resulting AND'd bitmap. In some embodiments, the processing logic can produce a set of AND'd bitmaps, one associated with each bounding volume.

At block 910, the processing logic can process each AND'd bitmap (block 908). A dirty bit in an AND'd bitmap means that the object is at least partially enclosed by the bounding volume corresponding to that AND'd bitmap (in other words, there is overlap between the object and the bounding volume). If the AND'd bitmap does not contain any dirty bits, then there is no overlap between the object and the bounding volume. If the AND'd bitmap does contain a dirty bit, then processing can proceed to block 912. When each AND'd bitmap has been processed, processing can return to block 902 to process the next object.

At block 912, the processing logic can bin or otherwise associate the object to the bounding volume. Referring to FIG. 9B, for example, in some embodiments a BV table 922 can be allocated, for instance, in memory 204 (FIG. 2). A "BV pointer" can point to a location in memory 204 to the beginning of the BV table 922. Each entry in the BV table 922 can correspond to a bounding volume. The BV pointer can point to the first entry in the BV table 922 for the first bounding volume. The address in the BV table 922 for the $n^{th}$ bounding volume can be computed as BV pointer+(n−1). Each entry in the BV table 922 can include an object count field and an offset field. The object count field can indicate the number of objects that overlap (entirely or partially) with the corresponding bounding volume. For example, the first bounding volume has an object count of 7, the second bounding volume has an object count of 8, and so on. The offset field in the BV table 922 identifies an entry in an object table 924, which can contain information about each object binned to that bounding volume. An "Object pointer" can point to the starting location of the object table 924 in memory 204. Each entry in the object table 924 can contain information about the objects that are binned to the corresponding bounding volume. It will be appreciated that the storage configuration shown in FIG. 9B is merely illustrative, and that other storage configurations can be used.

Referring to FIGS. 11-15, 16A, and 16B, the discussion will now turn to descriptions of high level block diagrams of logic circuits (processing logic) for binning objects to bounding volumes in accordance with the processing shown in FIG. 9A. The logic circuits disclosed herein can be implemented on any suitable hardware platform such as field programmable gate arrays (FPGAs), application specific ICs (ASICs), and the like, including different combinations of hardware platforms, and so on.

Figure 11:
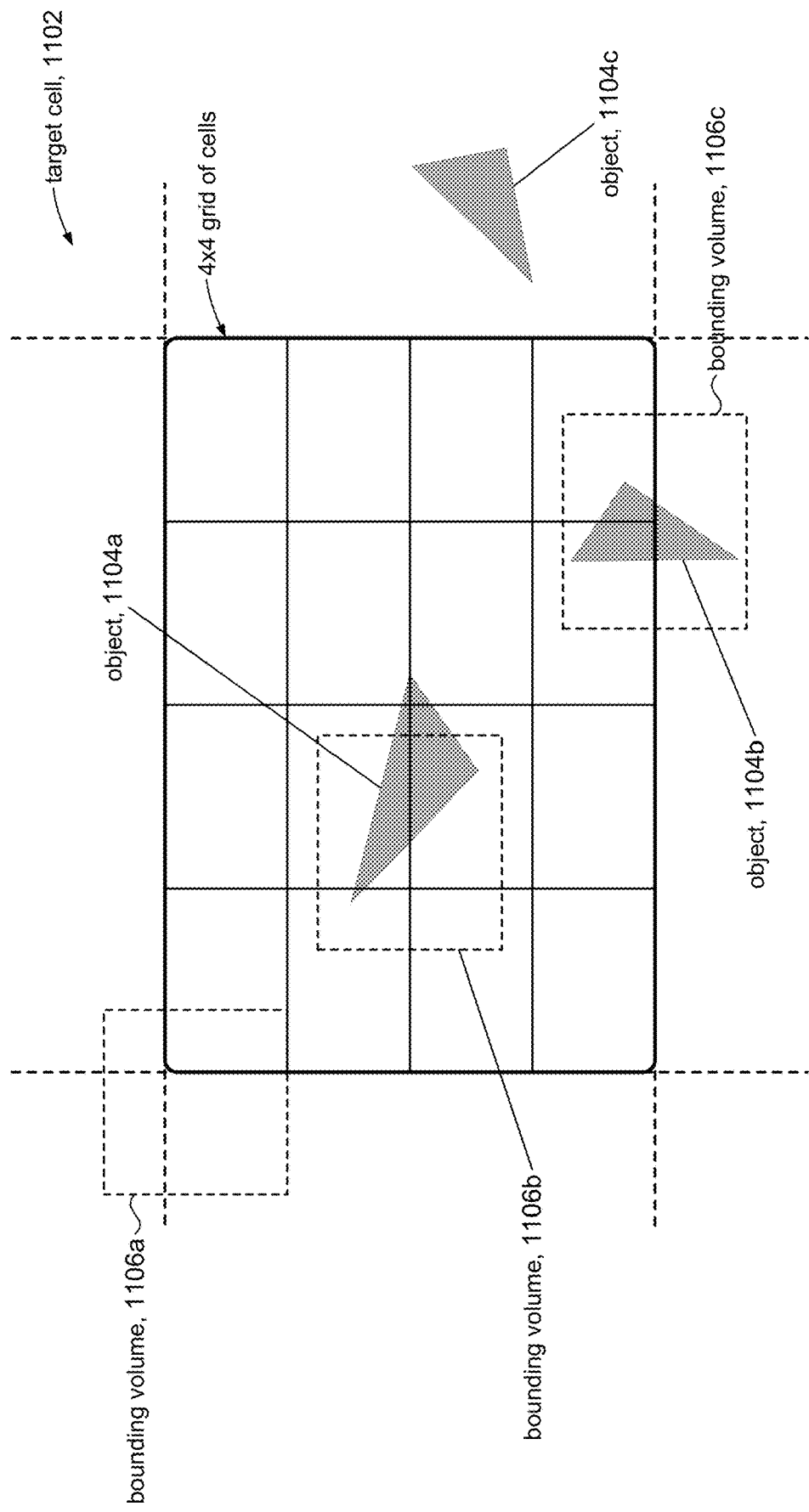
FIG. 11 shows an example of bounding volumes and objects in a target cell.

The binning of objects to bounding volumes can be discussed relative to a "target cell." In other words, for a given cell (the target cell) we want to bin objects in that target cell to bounding volumes in that target cell. The target cell can be the entire scene in some instances, and in other instances, the target cell can be a cell in a grid of cells of a given partitioning of the scene. An object or a bounding volume is "in" the target cell if at least a portion of the object or bounding volume overlaps that target cell. Referring to FIG. 11, for example, target cell 1102 includes objects 1104a, 1104b that are deemed to be "in" the target cell 1102 because they lie within or at least overlap the target cell, while object 1104c is not in the target cell 1102. The bounding volumes 1106a, 1106b, 1106c are also deemed to be in target cell 1102. The binning process would bin object 1104*a* to bounding volume 1106*b* and object 1104*b* to bounding volume 1106*c*.

Figure 12:
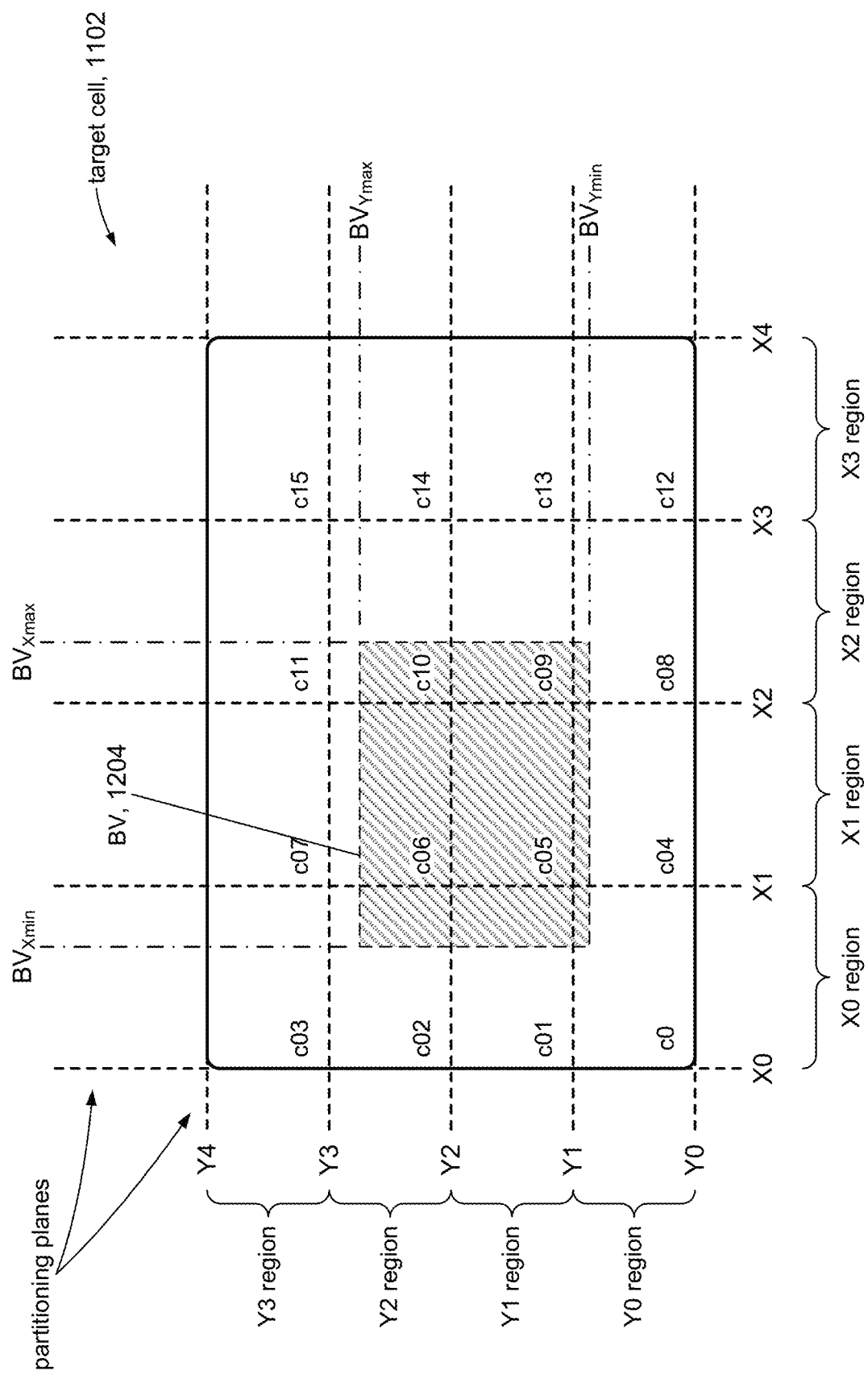
FIG. 12 shows an example of partitioning planes and bounding volume grid coordinates.

Referring to FIG. 12, the target cell 1102 can be partitioned into a grid of cells; the example shown in FIGS. 11 and 12 show a 4×4 grid of cells. The grid coordinates of the target cell 1102 refer to the X- and Y-coordinates of the partitioning planes that define the grid of cells. FIG. 12, for example, shows cells c0-c15 are defined by X- and Y-partitioning planes X0-X4 and Y0-Y4. Similarly, each bounding volume 1204 can be defined in terms of its bounding volume grid coordinates, which in some embodiments comprise a minimum X-coordinate, a maximum X-coordinate, a minimum Y-coordinate, and a maximum Y-coordinate of each bounding volume (assuming a rectangular bounding volume in a 2-D grid). The bounding volume grid coordinates can be referred to as "grid" coordinates in that, in some embodiments, the bounding volumes are defined on cell boundaries and so their coordinates line up with partitioning planes that define the cell; although in other embodiments (such as shown in FIGS. 11 and 12, for example), the bounding volumes need not be aligned to the cells.

Figure 13:
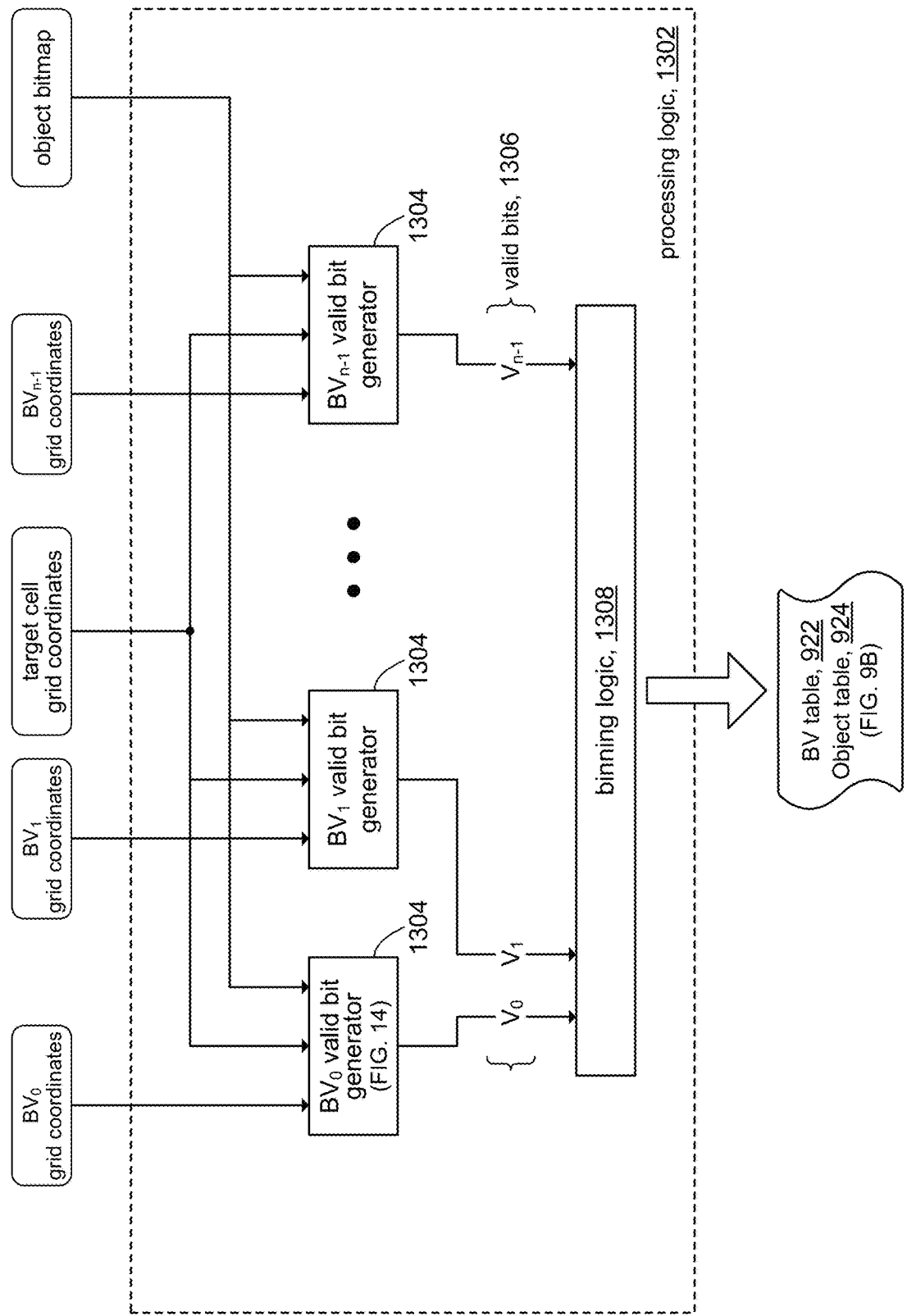
FIG. 13 shows an example of logic circuitry for binning an object to bounding volumes in accordance with some embodiments.

Referring to FIG. 13, processing logic 1302 can bin an object (e.g., 1104*a*, FIG. 11) to bounding volumes (e.g., 1102*a*-1102*c*) in a given target cell (e.g., 1102) in accordance with some embodiments. In some embodiments, inputs to the processing logic 1302 can include grid coordinates of the target cell and grid coordinates of bounding volumes in the target cell.

The processing logic 1302 can receive the object bitmap of the object using the target cell coordinates and the object coordinates. The number of bits in the object bitmap depend on the grid resolution of the target cell. For example, the target cell 1102 in FIG. 11 is partitioned into a grid resolution of 4×4. The object bitmap for object 1104*b*, for example, is [0000 0000 1000 1000]. On the other hand, the object bitmap for object 1104*c* would be [0000 0000 0000 0000], since object 1104*c* is not in the target cell 1102. In some embodiments, the binning can be performed in accordance with commonly owned U.S. Pat. No. 9,035,946, which is incorporated herein by reference, to produce the object bitmap.

The processing logic 1302 can include a valid bit generator 1304 for each bounding volume $BV_0$-$BV_{n-1}$. Each valid bit generator 1304 can receive the target cell coordinates, the grid coordinates for its corresponding bounding volume, and the object coordinates to produce a valid bit 1306 corresponding to the bounding volume. The valid bit 1306 will be set if the object intersects with the corresponding bounding volume.

The processing logic 1302 can include binning logic 1308 to access the BV table 922 (FIG. 9B) and the Object table 924. In operation, the binning logic 1308 can access entries in the BV table 922 and the Object table 924 that correspond to each valid bit 1304 to bin the object to the bounding volume(s) that overlap with the object. For example, the binning logic 1308 can access the BV table 922 and the Object table 924 (FIG. 9B) to store the object-to-bounding volume binning information described above. It will be appreciated that any suitable data representation can be used to associate an object to the bounding volume(s) that contain the object.

Figure 14:
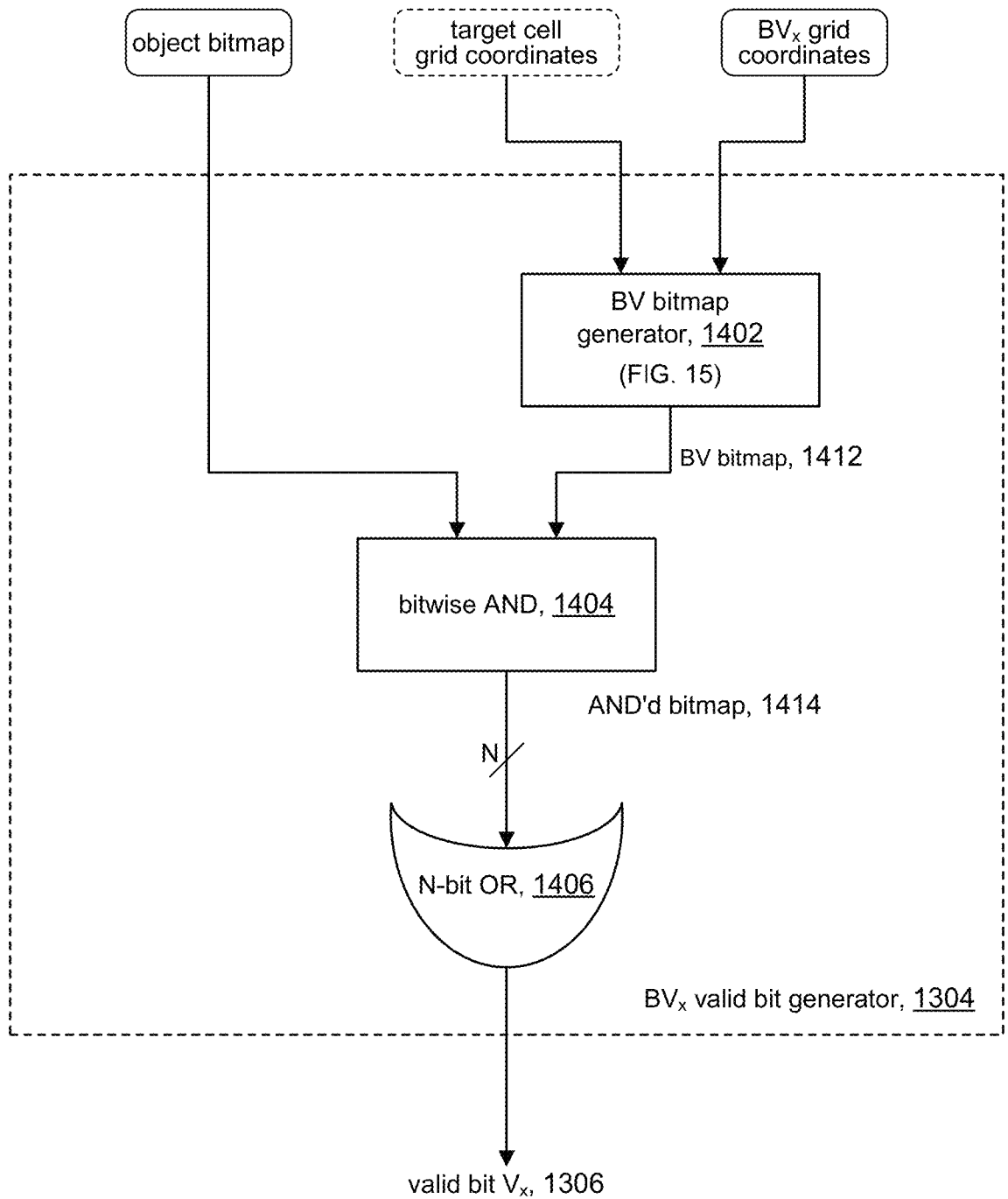
FIG. 14 shows logic circuitry for a valid bitmap generator shown in FIG. 13 in accordance with some embodiments of the present disclosure.

Referring to FIG. 14, details of a valid bit generator 1304 from FIG. 13 will be explained. In some embodiments, the valid bit generator 1304 can include a BV bitmap generator 1402. The BV bitmap generator 1402 can be configured to generate a BV bitmap 1412 using the target cell coordinates and the coordinates for a given bounding volume $BV_x$. Similar to the object bitmap, BV bitmap 1412 can be expressed in terms of the grid resolution at which the target cell 1102 is partitioned. The BV bitmap 1412 for bounding volume 1106*a* in FIG. 11, for example, is [0001 0000 0000 0000].

The valid bit generator 1304 can include a bitwise AND operator 1404 to compare the object bitmap and the BV bitmap 1412. The bitwise AND operator 1404 can produce an AND'd bitmap 1414 in which dirty (e.g., set) bits represent cells comprising the target cell that contain at least a portion of the object and at least a portion of the bounding volume $BV_x$. At this point, the valid bit generator 1304 has identified, in a single pass through the logic, all the cells (i.e., dirty cells) comprising the target cell that overlap with (1) at least a portion of the object and (2) at least a portion of the bounding volume $BV_x$.

The valid bit generator 1304 can include an N-bit OR operator 1406 to OR together the bits in the AND'd bitmap 1414, thus producing a valid bit $V_x$ 1306 for the bounding volume $BV_x$. The valid bit $V_x$ tells us that the object is at least partially contained in bounding volume $BV_x$, indicating that the object should be binned to bounding volume $BV_x$ (e.g., via binning logic 1308, FIG. 13).

Referring back to FIG. 13 for a moment, it can be appreciated from the foregoing that the processing logic 1302 does not require traversing the BV tree in order to bin an object to the bounding volumes, but rather can directly process the bounding volumes at the leaf nodes from the BV tree as if the BV tree was flattened. Binning an object in accordance with the present disclosure can be achieved by processing the bounding volumes $BV_0$, $BV_2$, . . . $BV_{n-1}$ directly using a valid bit generator 1304 for each bounding volume to bin the object, thus avoiding the need to traverse the BV tree. The intermediate nodes (e.g., nodes shown in dashed lines in FIG. 6F) are not processed; i.e., the BV tree is flattened (e.g., FIG. 6G). The binning process can be performed efficiently and quickly by directly processing the leaf nodes in accordance with the present disclosure, thus greatly improving the computer's performance for ray tracing.

Figure 15:
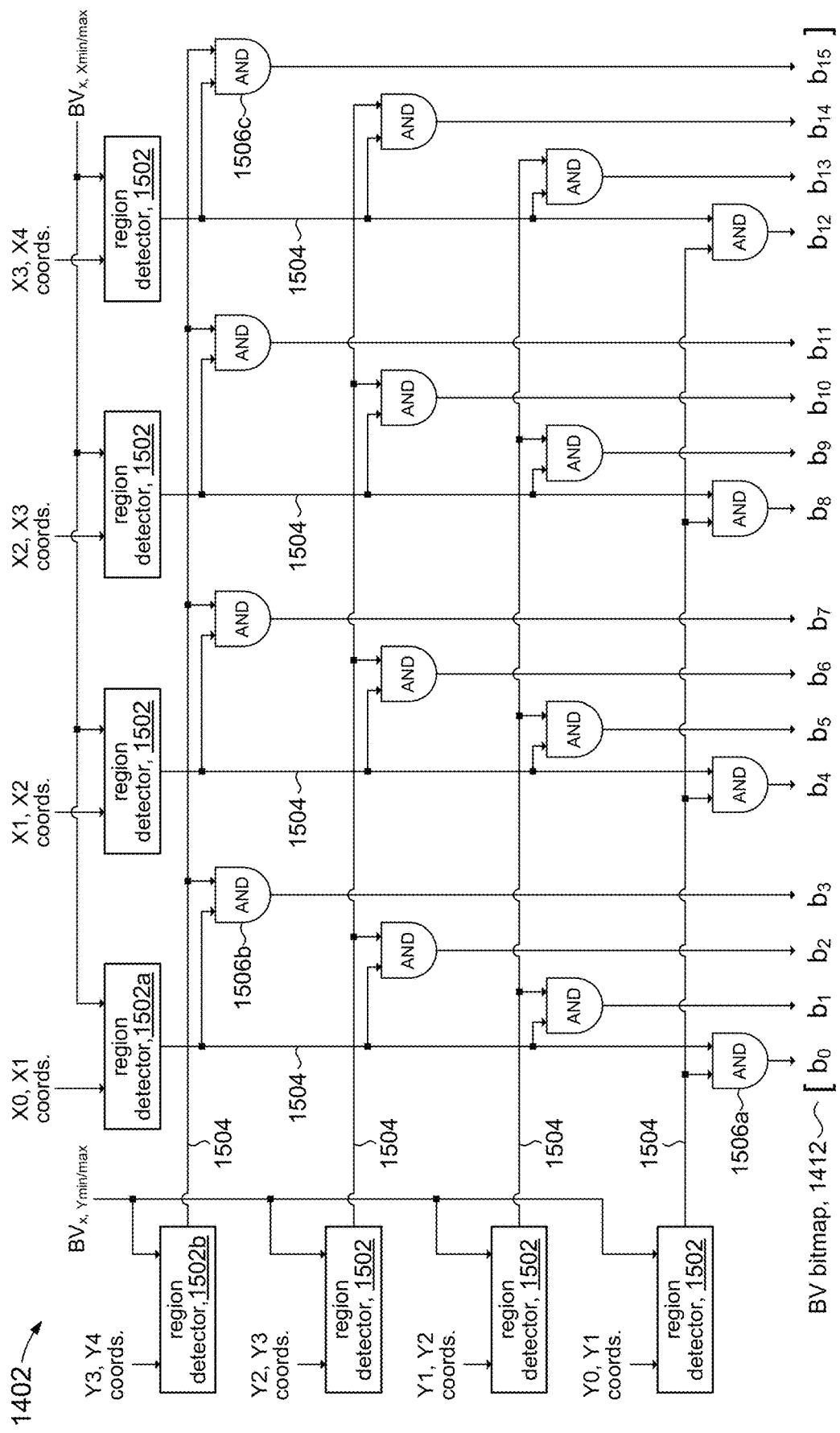
FIG. 15 shows logic circuitry for a BV bitmap generator in accordance with some embodiments of the present disclosure.

Referring to FIG. 15, details of an illustrative embodiment of BV bitmap generator 1402 (FIG. 14) configured to produce the BV bitmap 1412 in accordance with some embodiments of the present disclosure will now be described. Reference is also made to FIG. 12 to illustrate the discussion with an example.

In some embodiments, the BV bitmap generator 1402 can include region detectors 1502. As explained above in connection with FIG. 12, the target cell 1102 is partitioned into a grid of cells, and the target cell grid coordinates represent the coordinates of the partitioning planes that partition the target cell. Pairs of partitioning planes define regions in the partitioned target cell. For example, partitioning planes X0, X1 define an X0 region, partitioning planes X1, X2 define an X2 region, partitioning planes Y0, Y1 define a Y0 region, and so on.

Inputs to the region detectors 1502 include the grid coordinates of the target cell 1102 that define the partitioning planes. A given region detector 1502 will detect a region depending on the pair of partitioning planes that feed into the detector. For example, the region detector 1502*a* receives the coordinates for partitioning planes X0 and X1, and will detect the X0 region of the partitioned target cell 1102 Likewise, the Y3 region of the partitioned target cell 1102 is detected by region detector 1502b, which receives the Y3 and Y4 partitioning plane coordinates, and so on for each region detectors 1502.

Inputs to the region detectors 1502 can further include the grid coordinates of the bounding volume $BV_x$. The grid coordinates of the bounding volume can comprise the minimum and maximum X- and Y-grid coordinates of the bounding volume. In some embodiments, the min and max X-coordinates of the bounding volume (which represent its X-axis boundaries) feed into each of the X region detectors (e.g., 1502a), and the min and max Y-coordinates of the bounding volume (which represent its Y-axis boundaries) feed into each of the Y region detectors (e.g., 1502b).

Each region detector 1502 outputs a detection bit 1504 that indicates whether an X- or Y-axis boundary of the bounding volume $BV_x$ lies within the corresponding region. For example, the X region detectors detect whether either of the X-axis boundaries of the bounding volume $BV_x$ lies in one of the X regions X0-X3, and likewise the Y region detectors detect whether either of the Y-axis boundaries of the bounding volume $BV_x$ lies in one of the Y regions Y0-Y3.

The BV bitmap generator 1402 can include a set of AND gates connected to the region detectors 1502. More particularly, the output of each X region detector (e.g., 1502a) is AND'd with the output of each Y region detector (e.g., 1502b). The outputs of the AND gates constitute the BV bitmap 1412. It can be seen that each AND gate represents an intersection between an X region and a Y region. Referring to FIG. 12, for example, AND gate 1506a represents an intersection between the X0 and Y0 regions, which corresponds to cell c0. AND gate 1506b represents an intersection between the X0 and Y3 regions, which corresponds to cell c3. AND gate 1506c represents an intersection between the X3 and Y3 regions, which corresponds to cell c15, and so on.

It can be appreciated from the foregoing, that the output of an AND gate indicates whether a portion of the bounding volume $BV_x$ lies in the cell corresponding to that AND gate (e.g., output is logic '1') or not (e.g., output is logic '0'). Referring to FIG. 12, for example, we see that a corner of the bounding volume lies in cell c0. Accordingly, the output of the AND gate 1506a that corresponds to cell c0 will be logic '1', and so bit $b_0$ will be set. A close inspection will reveal that the BV bitmap generator 1402 will produce the following bitmap 1412 for the target cell 1102 in FIG. 12 [1110 1110 1110 0000]. In accordance with the present disclosure, BV bitmap generator 1402 can produce the entire bitmap 1412 in one processing cycle, in real time (i.e., on the fly), which is significant in a more typical configuration where a cell can be 3-D with higher resolution grids. For example, a 3-D cell can comprise an 8×8×8 grid, which means a 512-bit bitmap.

Figure 16B:
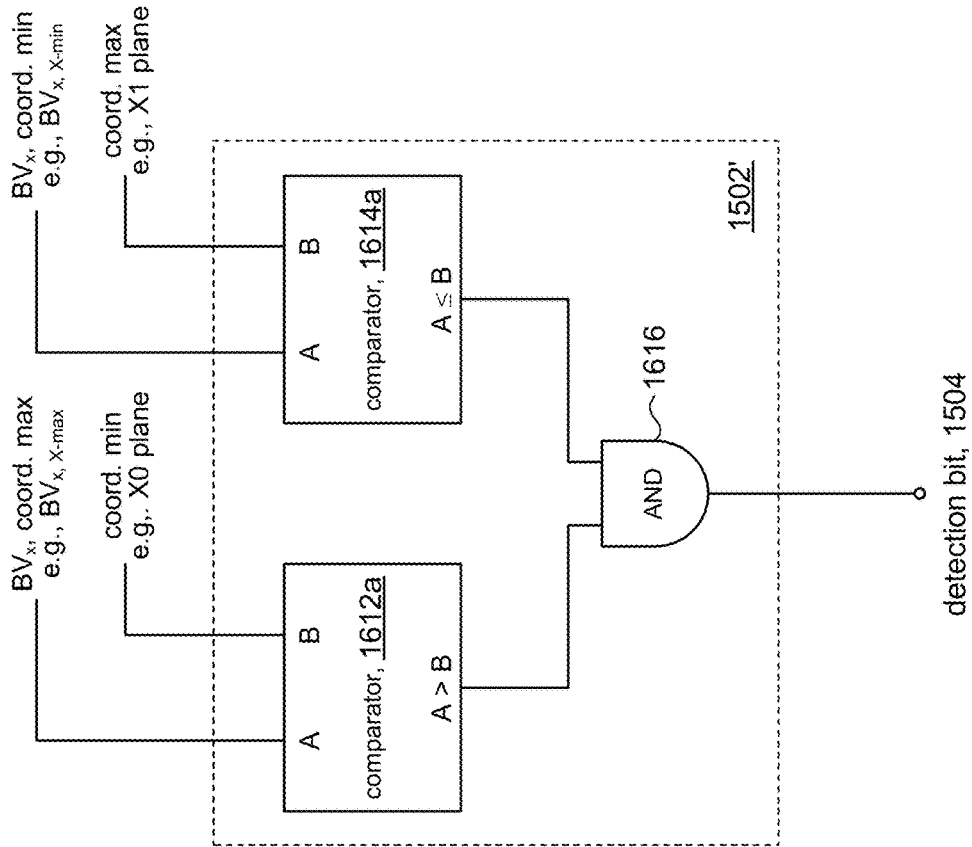
FIG. 16B shows logic circuitry for the region detectors shown in FIG. 15 in accordance with other embodiments of the present disclosure.
Figure 16A:
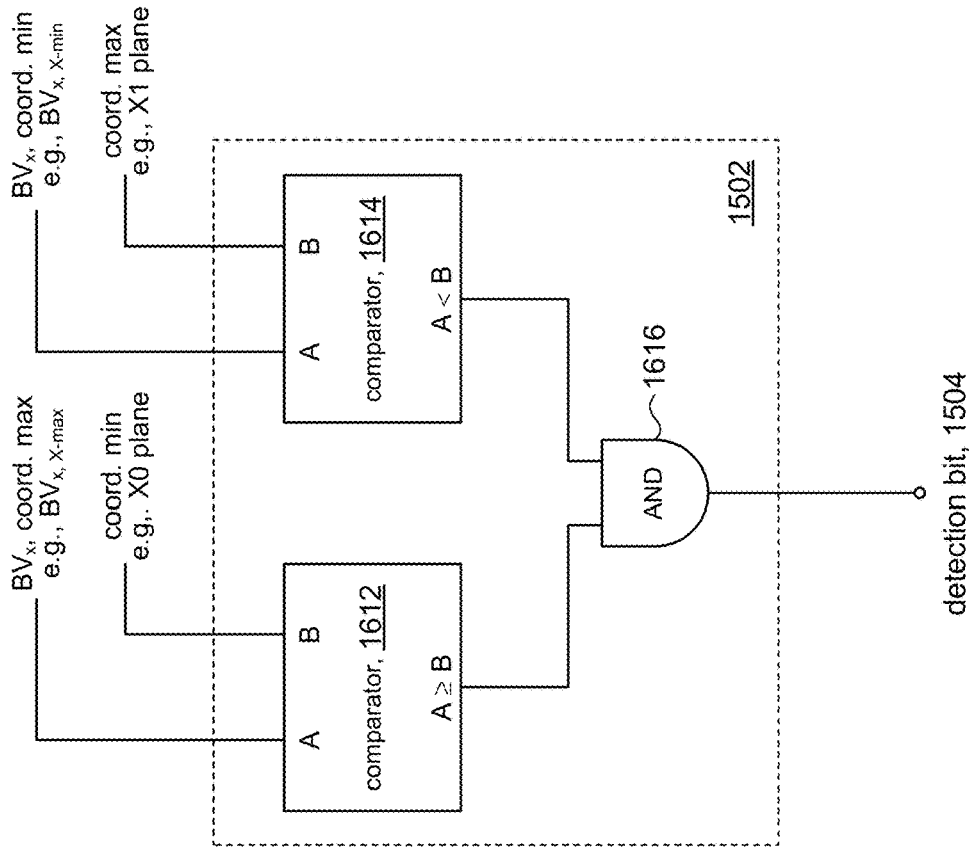
FIG. 16A shows logic circuitry for the region detectors shown in FIG. 15 in accordance with some embodiments of the present disclosure.

FIG. 16A shows an illustrative example of a detector circuit 1502 in FIG. 15. The detector circuit 1502 can comprise comparator logic circuits 1612 and 1614. The outputs of the comparator logic 1612, 1614 can be combined using AND gate 1616 to produce a detection bit 1504.

In operation, the detection bit 1504 indicates whether the X-axis (or Y-axis) boundaries of the bounding volume fall within the region (e.g., logic '1') or not (e.g., logic '0'). For example, detector circuit 1502 can implement the X0 region detector 1502a. As shown in FIG. 16A, the inputs to the detector circuit 1502 would be the coordinates (e.g., floating point values) for the X0 and X1 partitioning planes, and the Xmin and Xmax coordinates of the bounding volume $BV_x$. As another example, the detector circuit 1502 can implement the Y0 region detector 1502b. The inputs to the detector circuit 1502 would be the coordinates for the Y0 and Y1 partitioning planes, and the Ymin and Ymax coordinates of the bounding volume $BV_x$, and so on.

FIG. 16B shows an alternate detector circuit 1502', comprising comparator logic 1612a, 1614a which reverse the sense of the comparison made by the comparator logic 1612, 1614 comprising detector circuit 1502 in FIG. 16A.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for tracing a ray through a scene, the method comprising:
   receiving a plurality of geometric objects that comprise a target cell in the scene;
   defining a plurality of bounding volumes, wherein the plurality of bounding volumes are defined by a grid that subdivides the target cell into a plurality of cells;
   generating a plurality of bounding volume (BV) bitmaps that correspond to the plurality of bounding volumes, wherein each BV bitmap identifies cells in the target cell that overlap with at least a portion of the corresponding bounding volume;
   generating an object bitmap that corresponds to an object, wherein the object bitmap identifies cells in the target cell that overlap with at least a portion of the corresponding object; and
   binning the object to one or more of the plurality of bounding volumes using its object bitmap and the plurality of BV bitmaps,
   wherein tracing the ray through the scene includes identifying bounding volumes, from among the plurality of bounding volumes, that are intersected by the ray and identifying objects binned to those bounding volumes that are intersected by the ray.

2. The method of claim 1, wherein the object is binned to a bounding volume when at least one bit in the object bitmap that corresponds to the object and a corresponding bit in the BV bitmap that corresponds to the bounding volume are both set.

3. The method of claim 1, wherein binning the object to one or more of the plurality of bounding volumes comprises:
   identifying one or more dirty cells in the target cell using the object bitmap and the plurality of BV bitmaps, wherein a dirty cell is a cell that overlaps with at least a portion of at least one of the plurality of bounding volumes;
   identifying one or more bounding volumes that overlap with one or more of the dirty cells; and
   binning the object to each identified bounding volume.

4. The method of claim 3, wherein identifying one or more dirty cells includes performing a bitwise comparison between the object bitmap and each of the plurality of BV bitmaps.

5. The method of claim 4, wherein the bitwise comparison is a bitwise AND operation.

6. The method of claim 1, further comprising concurrently comparing the object bitmap to at least a subset of the BV bitmaps to concurrently bin the object to one or more bounding volumes in the subset.

7. The method of claim 1, wherein the object bitmap comprises a plurality of bits that correspond to cells in the target cell, wherein a bit in the object bitmap is set when the corresponding cell overlaps with at least of portion of the corresponding object, wherein a BV bitmap of a corresponding bounding volume comprises a plurality of bits that correspond to cells in the target cell, wherein a bit in the BV bitmap is set when the corresponding cell overlaps with at least of portion of the corresponding bounding volume.

8. The method of claim 1, wherein generating the object bitmap and generating the bounding volume bitmap are performed on the fly.

9. The method of claim 1, wherein the target cell is the entire scene.

10. The method of claim 1, further comprising partitioning the scene into a plurality of cells, wherein the target cell is one of the plurality of cells.

11. Apparatus for tracing a ray through a scene, the apparatus comprising:
    first logic circuitry to define a plurality of bounding volumes, wherein the plurality of bounding volumes are defined by a grid that subdivides a target cell in the scene into a plurality of cells;
    second logic circuitry to generate a plurality of bounding volume (BV) bitmaps that correspond to the plurality of bounding volumes, wherein each BV bitmap identifies cells in the target cell that overlap with at least a portion of the corresponding bounding volume;
    third logic circuitry to generate an object bitmap that corresponds to an object, wherein the object bitmap identifies cells in the target cell that overlap with at least a portion of the corresponding object; and
    fourth logic circuitry to bin the object to one or more of the plurality of bounding volumes using its object bitmap and the plurality of BV bitmaps,
    wherein tracing the ray through the scene includes identifying bounding volumes, from among the plurality of bounding volumes, that are intersected by the ray and identifying objects binned to those bounding volumes that are intersected by the ray.

12. The apparatus of claim 11, wherein the object is binned to a bounding volume when at least one bit in the object bitmap and a corresponding bit in the BV bitmap that corresponds to the bounding volume are both set.

13. The apparatus of claim 11, wherein binning the object to one or more of the plurality of bounding volumes comprises the fourth logic circuitry:
    identifying one or more dirty cells in the target cell using the object bitmap and the plurality of BV bitmaps, wherein a dirty cell is a cell that overlaps with at least a portion of at least one of the plurality of bounding volumes;
    identifying one or more bounding volumes that overlap with one or more of the dirty cells; and
    binning the object to each identified bounding volume.

14. The apparatus of claim 13, wherein identifying one or more dirty cells includes performing a bitwise comparison between the object bitmap and each of the plurality of BV bitmaps.

15. The apparatus of claim 11, wherein the object bitmap comprises a plurality of bits that correspond to cells in the target cell, wherein a bit in the object bitmap is set when the corresponding cell overlaps with at least of portion of the corresponding object, wherein a BV bitmap of a corresponding bounding volume comprises a plurality of bits that correspond to cells in the target cell, wherein a bit in the BV bitmap is set when the corresponding cell overlaps with at least of portion of the corresponding bounding volume.

16. The apparatus of claim 11, wherein the target cell is the entire scene.

17. The apparatus of claim 11, further comprising fifth logic circuitry to partition the scene into a plurality of cells, wherein the target cell is one of the plurality of cells.

18. Apparatus for tracing a ray through a scene, the apparatus comprising:
    means for receiving a plurality of geometric objects that comprise a target cell in the scene;
    means for defining a plurality of bounding volumes, wherein the plurality of bounding volumes are defined by a grid that subdivides the target cell into a plurality of cells;
    means for generating a plurality of bounding volume (BV) bitmaps that correspond to the plurality of bounding volumes, wherein each BV bitmap identifies cells in the target cell that overlap with at least a portion of the corresponding bounding volume;
    means for generating an object bitmap that corresponds to an object, wherein the object bitmap identifies cells in the target cell that overlap with at least a portion of the corresponding object; and
    means for binning the object to one or more of the plurality of bounding volumes using its object bitmap and the plurality of BV bitmaps,
    wherein tracing the ray through the scene includes identifying bounding volumes, from among the plurality of bounding volumes, that are intersected by the ray and identifying objects binned to those bounding volumes that are intersected by the ray.

19. The apparatus of claim 18, wherein the object is binned to a bounding volume when at least one bit in the object bitmap and a corresponding bit in the BV bitmap that corresponds to the bounding volume are both set.

20. The apparatus of claim 18, wherein the means for binning the object to one or more of the plurality of bounding volumes includes:
    identifying one or more dirty cells in the target cell using the object bitmap and the plurality of BV bitmaps, wherein a dirty cell is a cell that overlaps with at least a portion of at least one of the plurality of bounding volumes;
    identifying one or more bounding volumes that overlap with one or more of the dirty cells; and
    binning the object to each identified bounding volume.

* * * * *